(12) United States Patent
Horsnell

(10) Patent No.: US 12,346,693 B2
(45) Date of Patent: Jul. 1, 2025

(54) MONITOR EXCLUSIVE INSTRUCTION

(71) Applicant: Arm Limited, Cambridge (GB)

(72) Inventor: Matthew James Horsnell, Cambridge (GB)

(73) Assignee: Arm Limited, Cambridge (GB)

( * ) Notice: Subject to any disclaimer, the term of this patent is extended or adjusted under 35 U.S.C. 154(b) by 37 days.

(21) Appl. No.: 18/261,941

(22) PCT Filed: Dec. 10, 2021

(86) PCT No.: PCT/GB2021/053238
§ 371 (c)(1),
(2) Date: Jul. 18, 2023

(87) PCT Pub. No.: WO2022/162334
PCT Pub. Date: Aug. 4, 2022

(65) Prior Publication Data
US 2024/0086195 A1    Mar. 14, 2024

(30) Foreign Application Priority Data

Jan. 29, 2021    (GB) ..................................... 2101232

(51) Int. Cl.
*G06F 9/30*    (2018.01)
*G06F 9/38*    (2018.01)

(52) U.S. Cl.
CPC ............ *G06F 9/30087* (2013.01); *G06F 9/38* (2013.01)

(58) Field of Classification Search
CPC ...... G06F 9/3004; G06F 9/38; G06F 9/30076; G06F 9/30087; G06F 9/3834

(Continued)

(56) References Cited

U.S. PATENT DOCUMENTS 5,408,629 A  * 4/1995  Tsuchiya .................. G06F 9/52
                                                           711/151
9,223,701 B2 * 12/2015  Piry .......................... G06F 9/30
(Continued)

FOREIGN PATENT DOCUMENTS

EP         3588280 A1    1/2020

OTHER PUBLICATIONS

International Search Report for an International Application No. GB2021053238, dated Mar. 3, 2022.
(Continued)

*Primary Examiner* — Chun Kuan Lee
(74) *Attorney, Agent, or Firm* — NIXON & VANDERHYE P.C.

(57) ABSTRACT

An apparatus comprises an instruction decoder 20 and processing circuitry 22. Monitoring circuitry 36 monitors one or more events indicative of a potential update to data associated with any of a monitored set of addresses, and makes accessible to software executing on the processing circuitry 22 a monitoring reporting indication indicative of whether any events has occurred for at least one of the monitored set of addresses. In response to decoding of an exclusive status setting instruction specifying a given address, the processing circuitry 22 sets an exclusive status associated with the given address. The exclusive status is cleared in response to detecting an event indicative of a conflicting memory access to the given address. In response to decoding of a monitor exclusive instruction, the processing circuitry 22: determines whether the exclusive status is associated with a target address, and if so allocates the target address to be one of the monitored set of addresses.

19 Claims, 9 Drawing Sheets

(58) Field of Classification Search
USPC .......................................................... 712/220
See application file for complete search history.

(56) References Cited

U.S. PATENT DOCUMENTS

2015/0095580 A1   4/2015  Liu et al.
2017/0185458 A1   6/2017  Chaffin et al.

OTHER PUBLICATIONS

Combined Search and Examination Report for an International Application No. GB2101232.3, dated Nov. 3, 2021.
Robert Bedichek, "Some Efficient Architecture Simulation Techniques," Department of Computer Science, University of Washington, Seattle, Washington 98195.
Monitor—Set Up Monitor Address, vol. 2A.

\* cited by examiner

Variant 1: MONP Xd
Xd is destination register for updating with monitor polling information Variant 2: MONP Xd, [Xn]
Xd is destination register for updating with monitor polling information
[Xn] indicates information for identifying base address of identifier storage structure

MONITOR EXCLUSIVE INSTRUCTION

The present technique relates to the field of data processing.

A data processing system may have a number of requesting devices which may share access to a shared memory system. Sometimes, processing performed on a given requester device may need to wait for data to be updated in memory in response to a request from another requester device. For example, software executing on a CPU or other processing element may be waiting for a queue of data in memory to be updated by an input/output device such as a network interface controller. A similar problem may occur when multiple processes executing on the same processing element use structures in memory to provide inter-process communication. If the number of distinct addresses in memory to be monitored for changes by a given software process is large, then it can be inefficient to carry out this monitoring by the software repeatedly polling each address.

At least some examples provide an apparatus comprising: an instruction decoder to decode instructions; processing circuitry to perform data processing in response to the instructions decoded by the instruction decoder; and monitoring circuitry to monitor one or more events indicative of a potential update to data associated with any of a monitored set of addresses, and to make accessible to software executing on the processing circuitry a monitoring reporting indication indicative of whether any of the one or more events has occurred for at least one of the monitored set of addresses; in which: in response to the instruction decoder decoding an exclusive status setting instruction specifying a given address, the processing circuitry is configured to set an exclusive status associated with the given address; the processing circuitry is configured to clear the exclusive status associated with the given address in response to detecting an event indicative of a conflicting memory access to the given address; and in response to the instruction decoder decoding a monitor exclusive instruction, the processing circuitry is configured to: determine whether the exclusive status is associated with a target address; and when the exclusive status is determined to be associated with the target address, allocate the target address to be one of said monitored set of addresses for which the one or more events are to be monitored by the monitoring circuitry.

At least some examples provide a method comprising: in response to decoding of an exclusive status setting instruction specifying a given address, setting an exclusive status associated with the given address; in response to detecting an event indicative of a conflicting memory access to the given address, clearing the exclusive status associated with the given address; in response to decoding of a monitor exclusive instruction: determining whether the exclusive status is associated with a target address; and when the exclusive status is determined to be associated with the target address, allocate the target address to be one of a monitored set of addresses; monitoring one or more events indicative of a potential update to data associated with any of the monitored set of addresses; and making accessible to software a monitoring reporting indication indicative of whether any of the one or more events has occurred for at least one of the monitored set of addresses.

At least some examples provide a computer program which, when executed on a host data processing apparatus, controls the host data processing apparatus to provide an instruction execution environment for execution of instructions of target code, the computer program comprising: instruction decoding program logic to decode instructions of the target code to control the host data processing apparatus to perform data processing corresponding to the instructions of the target code; and monitoring program logic to monitor one or more events indicative of a potential update to data associated with any of a monitored set of addresses in a simulated address space, and to make accessible to the target code a monitoring reporting indication indicative of whether any of the one or more events has occurred for at least one of the monitored set of addresses; in which: in response to an exclusive status setting instruction of the target code specifying a given address in the simulated address space, the instruction decoding program logic is configured to control the host data processing apparatus to set an exclusive status associated with the given address, the computer program comprising exclusive status clearing program logic to clear the exclusive status associated with the given address in response to detecting an event indicative of a conflicting memory access to the given address in the simulated address space; and in response to a monitor exclusive instruction of the target code, the instruction decoding program logic is configured to control the host data processing apparatus to: determine whether the exclusive status is associated with a target address in the simulated address space; and when the exclusive status is determined to be associated with the target address, allocate the target address to be one of said monitored set of addresses for which the one or more events are to be monitored by the monitoring program logic.

The computer program may be stored on a computer-readable storage medium. The computer-readable storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing system having a number of requester devices and an interconnect for coupling the requester devices and controlling access to shared memory by the requester devices;

Figure 1:
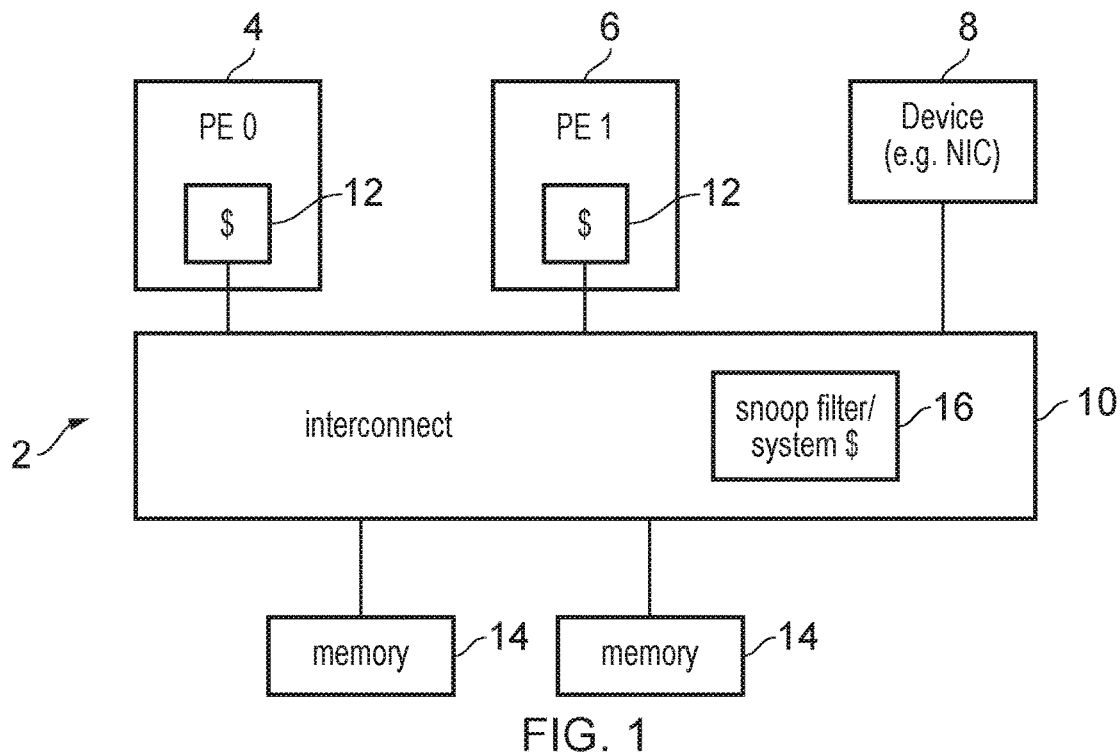

An apparatus may have an instruction decoder to decode instructions, and processing circuitry to perform data processing in response to the instructions decoded by the instruction decoder. The instruction decoder and processing circuitry may support instructions defined according to a particular instruction set architecture (ISA).

Monitoring circuitry may be provided to monitor one or more events indicative of a potential update to data associated with any of a monitored set of addresses. The monitoring circuitry may make accessible to software executing on the processing circuitry a monitoring reporting indication indicative of whether any of the one or more events has occurred for at least one of the monitored set of addresses. Such monitoring circuitry can be useful because it allows software to identify whether a particular address has been updated without the software needing to explicitly poll that address by repeatedly issuing read requests to the monitored address. The monitoring circuitry can have circuit logic implemented in hardware, which can monitor relevant events which could indicate a potential update to one of the monitored set of addresses, and provide the monitoring reporting information to software when such an event has occurred. The monitored set of addresses may be configurable by software and may be capable of specifying two or more addresses as the monitored set, so is not restricted to monitoring of only a single address.

In a system having the monitoring circuitry, there may be some performance overhead associated with the software configuring the monitored set of addresses to control which addresses are to be monitored by the monitoring circuitry provided in hardware. For example, the software may be monitoring for updates to a large number of queues stored in memory, but not all of the queues may need to be monitored at a given time and sometimes the software may wish to evaluate certain status information about each queue, such as whether the queue is active or ready to accept updates, in order to decide whether it is necessary to monitor that queue. The software may need to guard against potential updates to the status information between the point at which the status information is read and the point at which it is decided whether or not to monitor a corresponding address. It will be appreciated that this example of monitoring queues and checking status information is just one potential use case that software could implement (there will also be others), which illustrates an example scenario in which there may be some overhead in establishing the monitored set of addresses to be monitored for updates.

In the examples discussed below, the instruction decoder and processing circuitry support processing of a monitor exclusive instruction. The monitor exclusive instruction may be an instruction defined by the ISA supported by the instruction decoder and processing circuitry.

In response to the instruction decoder decoding the monitor exclusive instruction, the processing determines whether an exclusive status is associated with a target address, and when the exclusive status is determined to be associated with the target address, allocates the target address to be one of the monitored set of addresses for which the one or more events are to be monitored by the monitoring circuitry.

The exclusive status can be set for a particular address by executing an exclusive status setting instruction. In response to the instruction decoder decoding an exclusive status setting instruction specifying a given address, the processing circuitry may set an exclusive status associated with the given address. The processing circuitry may clear the exclusive status associated with the given address in response to detecting an event indicative of a conflicting memory access to the given address. The detection of such events indicative of a conflicting memory access could be implemented in hardware and need not necessarily involve explicit software instructions to be executed by the process which executed the exclusive status setting instruction. The exclusive status setting instruction allows software to set an exclusive status for a particular address so that it can check on a subsequent instruction whether any conflicting memory access has occurred in the period between the exclusive status setting instruction and the subsequent instructions. However, in practice processors which support such exclusive status setting instructions may often limit the exclusive status to be set for relatively few addresses (in some cases only for a single address), and so the exclusive status alone may be insufficient for dealing with multi-address monitoring use cases where the number of addresses to be monitored for changes could be large (e.g. 50-100 or more), so the monitoring circuitry may be more appropriate for problems involving multiple addresses to be monitored. Nevertheless, the support for assigning the exclusive status to an address can be useful for supporting a monitor exclusive instruction which can improve ease of configuration of the monitored set of addresses to be monitored by the monitoring circuitry.

Hence, in response to the monitor exclusive instruction, it is checked whether the exclusive status is associated with a target address, and if the exclusive status is still determined to be associated with a target address (indicating that there has not been a conflicting memory access to the target address since the exclusive status was assigned), then the target address is allocated to be one of the set of monitored addresses for which the one or more events are to be monitored by the monitoring circuitry. This is useful for allowing any status information checks (for deciding whether the target address should be monitored) to be implemented atomically even if they require a more complex check that cannot be performed in a single instruction.

For example, before allocating a particular address to the set of monitored addresses, the software may need to check the state of some information in memory and this could be done by loading data from a particular address, checking the data using a sequence of one or more instructions, and then if the state of the data is as expected start monitoring by allocating that address to the monitored set of addresses. However, to avoid race conditions (where data for a checked address is updated by another process or device between the address being read and the outcome of the checking for that address being determined) these operations may need to be done atomically. This could be relatively simple in a case where the check is merely a single comparison of the data against a known value, so that a single instruction could load the address, compare it and allocate it to the monitored set of addresses if the comparison matches. However, the inventor recognised that in practice software may wish to test more than a single comparison condition associated with the address, for example potentially testing multiple elements at different portions of an addressed memory location, or applying more complex comparison conditions than merely a single equals comparison, and so this may require more than one instruction to evaluate whether the condition required to allocate the address into the monitored set of addresses is satisfied. The support for the monitor exclusive instruction described above means that software is able to implement arbitrarily complex comparison conditions, while still avoiding race conditions by being able to carry out the checks atomically, since a sequence of code including the exclusive status setting instruction followed by some instructions to implement the checks and then a monitor exclusive selection can atomically check the data, carry out the required comparison operations and if successful promote the target address into the monitored set of addresses being tracked by the monitoring circuitry. Hence, providing ISA support for the monitor exclusive instruction can make configuration of the monitored set of addresses simpler to manage for software while still enabling arbitrarily complex test conditions and providing a support for an atomic operation which avoids data race conditions.

There can be different ways for the monitoring circuitry to implement monitoring of the one or more events indicative of a potential update to data associated with any of the monitored set of addresses. In some cases the monitoring circuitry may reuse some functions that may already be provided within a data processing system for managing coherency between caches in different requesting devices. Such coherency schemes may for example require certain coherency messages (e.g. memory access requests/responses or snoop requests/responses) to be exchanged between a requester device and an interconnect when data at a particular address is to be accessed, with the interconnect being able to send snoop requests to other requester devices if necessary maintain coherency between data cached for the same address at different locations in the system. In some cases the monitoring of the events by the monitoring circuitry may be based on intercepting some snoop messages exchanged within the system, and detecting from the snoop messages/responses when a given address is potentially being updated. Alternatively, the monitoring circuitry could monitor the transitions in cache coherency state within a cache associated with the processing circuitry, to detect changes in cache coherency state that may be triggered by such snoop requests (rather than checking the snoop requests themselves). However, unlike conventional coherency mechanisms, where any changes in coherency state of data cached at particular requester devices and any snoop messaging exchanged between different devices to maintain coherency may be transparent to the software executing on the processing circuitry, so that the software is not informed when data cached at one device is accessed from another device, with the monitoring performed by the monitoring circuitry, the monitoring circuitry is able to make accessible, to software executing on the processing circuitry, a monitoring reporting indication indicating whether any events have occurred for one or more of the monitored set of addresses.

For example, this monitoring reporting indication could be an interrupt sent to interrupt the processing currently being performed on the processing circuitry so that the processing circuitry can then execute instructions (e.g. one or more instances of the monitor polling instruction discussed below) to check which addresses may have been updated. It is not essential that the monitoring reporting indication itself needs to identify the specific one of the monitored set of addresses which encountered the event. In some cases the interrupt sent could be a general interrupt indicating that an event has occurred for any one of the monitored set of addresses without distinguishing which address encountered the event. Alternatively, other approaches may provide a monitoring reporting indication in the form of an interrupt which is also associated with certain status/syndrome information (e.g. stored in a software-accessible register and updated by the monitoring circuitry when an event occurs for a monitored address) which could be checked to check which address has had an update. Other examples may not interrupt the processor when an event occurs, but could simply make data available in the software-accessible register that could indicate at least whether any of the monitored set of addresses has encountered an update and could optionally also report which addresses have been updated. Hence it would be appreciated that there are a variety of techniques by which the monitoring circuitry can make the monitoring reporting indication accessible to software.

In some cases the events detected by the monitoring circuitry could include events which may sometimes indicate that data has been updated associated with one of the monitor set of addresses, but which could also be false positive events which may on another occasions be detected even if the data has not actually been updated. Hence, the events detected by the monitoring circuitry may be any event which could, on at least some occasions, indicate there is a risk that the data could have been updated. It is not essential for the monitoring circuitry to actually detect whether data definitely has been updated. For example, sometimes the monitoring circuitry may detect invalidation of a cache entry, or a change of coherency state for a cached entry, which may have occurred due to a snoop request sent as a consequence of a request from another requester device which may not yet have updated the corresponding data but may just be priming the system to ensure that there are no conflicting copies of the data remaining in other caches (e.g. preparing that other requester device to have exclusive access to the data so that a number of subsequent updates can be performed more efficiently due to not needing to check coherency status in other caches). On other occasions, the same invalidation or coherency state transition of the cache entry could be caused by an actual update. Hence, such an invalidation or coherency state transition can be an example of an event indicating a potential update, but which could be a false positive as it is possible no update has yet taken place.

In response to the instruction decoder decoding the monitor exclusive instruction, the processing circuitry may return a monitoring allocation status indication accessible to software, which indicates whether the target address was successfully allocated to be one of the monitored set of addresses in response to the monitor exclusive instruction. This can be useful for software to decide whether it is necessary to re-attempt the operations for allocating the target address to the monitored set of addresses.

When allocation of the target address to be one of the monitored set of addresses is unsuccessful, the monitoring allocation status indication could indicate a reason for failure of the allocation. For example the monitoring allocation status indication could distinguish between at least two of the following reasons: the exclusive status no longer being set for the target address; the exclusive status being set for an address other than the target address; and the monitoring circuitry being unavailable or not yet configured to accept allocation of addresses into the monitored set of addresses. For example the monitoring allocation status indication could be a multi-bit indicator which has one encoding allocated to indicate successful allocation and a number of other encodings corresponding to different reasons for failure. Distinguishing different reasons can help the software to determine how to proceed.

In some examples, the monitoring allocation status indication could be made accessible to software by writing it to a software-accessible register. The software-accessible register could be a destination register specified by a register field of the monitor exclusive instruction, or could be a default register which is implicitly assumed to be the register to use for writing the monitoring allocation status indication, without an explicit register field identifying that register being specified in the instruction encoding of the monitor exclusive instruction.

The target address can be specified in different ways by the monitor exclusive instruction. in one example, the monitor exclusive instruction itself specifies a target address. For example, the encoding of the monitor exclusive instruction could include operand information for identifying the target address. For example, the monitor exclusive instruction could specify a register specifier identifying an architectural register which provides address information for determining the target address.

However, in other examples the monitor exclusive instruction need not itself identify the target address, and instead the target address could be identified implicitly as being an address specified as the given address by a most recent exclusive status setting instruction prior to the monitor exclusive instruction. For example, the circuit logic for tracking the exclusive status associated with a particular address could maintain an indication of the address for which exclusive status was set most recently, and then when a monitor exclusive instruction is encountered then this address can be assumed to be the target address for the monitor exclusive instruction. The indication of the most recently set exclusive address tracked by the exclusive status tracking hardware need not explicitly identify the address itself (although this is one option). Another option is to identify the address through other information related to the address, such as information identifying a particular cache entry which caches the data associated with the address. It will be appreciated that the ISA definition of the monitor exclusive instruction may specify that the target address is the most recent address for which exclusive status was set by an earlier exclusive status setting instruction, but the particular way in which the hardware of the processing circuitry tracks which address was the most recent address having the exclusive status may vary in an implementation-specific manner.

An advantage of defining the target address implicitly as the given address specified by a most recent exclusive status setting instruction is that this frees up bit space in the encoding of the monitor exclusive instruction which can be used for other purposes. Instruction encoding space may be at a premium in many ISAs and so any efficiencies of encoding can be valuable even if they only save relatively few bits. For example by not needing to encode a register field corresponding to the target address, the encoding of the monitor exclusive instruction may support a register field for specifying other information.

In some examples, in response to the instruction decoder decoding the monitor exclusive instruction, when the exclusive status is determined to be associated with a target address, the processing circuitry may allocate, to an entry of an identifier storage structure corresponding to the target address, an identifier value specified as an operand of the monitor exclusive instruction. For example, the identifier value could be specified as an immediate value in the encoding of the monitor exclusive instruction, or could be read from a register identified based on a register field specified in the encoding of the monitor exclusive instruction. This allows software to assign an identifier value (arbitrarily selected by the software) for representing the target address which is allocated in the to the monitored set of addresses.

This can be useful because in many processing systems the software which is configuring the monitoring may use virtual addresses to identify particular data structures in memory, but the monitoring may be based on physical addresses, for example because the monitoring may be reusing information from coherency messages which identify addresses using the physical addresses which correspond to particular locations in the memory system. In many systems, there may not be an efficient mechanism for reverse address translations to translate physical addresses back into virtual addresses, so when the monitoring circuitry has identified that an update has occurred for a particular monitored physical address, it may be desirable to provide a mechanism by which the monitoring circuitry may identify to the software some information which allows the software to identify which monitored address was the one of the monitored set that encountered the event. For example, the identifiers allocated by software could identify one of a number of queues in memory to be monitored or could be an array index used by software to identify an element within an array structure (the precise meaning of the identifier is up to software and is not a feature of the processor architecture or the hardware of the data processing apparatus).

Hence, when the monitoring circuitry detects that any of the one or more events has occurred for a given monitored address, the monitoring circuitry is able to make accessible to software an indication of an identifier stored in an entry of the identifier storage structure that corresponds to the given monitored address for which the events occurred. This helps software to identify which is the relevant location in memory that has been updated, without needing to implement a reverse translation mechanism which can be more costly in terms of circuit area and/or performance (depending on the extent to which it is supported in hardware or software).

The identifier storage structure can be implemented in different ways. In some cases the identifier storage structure could comprise a dedicated address monitoring tracking structure which has a number of entries, each entry for tracking information associated with the corresponding one other set of addresses to be monitored. For example, the address monitoring tracking structure could be a dedicated structure implemented in hardware, separate from a data cache. The address monitoring tracking structure may have entries large enough to accept the software-defined identifier associated with each monitored address. The address monitoring tracking structure could also track other pieces of information such as whether or not any events have occurred for the monitored address in a particular entry.

However, in other examples the identifier storage structure could comprise a data structure stored in memory. For example, the monitor exclusive instruction could specify a register field which can identify a register which provides a memory address specifying information for identifying a base address of the identifier storage structure (the value in the register could directly identify the base address, or could identify other information from which the base address can be determined—e.g. another address where the base address of the identifier storage structure is at a fixed implicitly-defined offset from that address). In response to the monitor exclusive instruction, if the address allocation operation is successful, the processing circuitry can use the base address (and an offset derived from the target address or other information related to the target address, such as cache set/way information indicating a cache entry corresponding to the target address) to identify an address of the relevant entry of the identifier storage structure to be updated with the identifier corresponding to the allocated target address.

By providing the identifier storage structure as a data structure stored in memory, the hardware cost of supporting the monitoring is lower as there is no need to provide a dedicated storage structure in hardware for storing the software provided identifiers. Note that identifiers from the data structure representing the identifier storage structure may be ultimately stored in memory, but may also be cached so that it can be accessed faster than the underlying memory (and in some cases if cached in a write-back cache, it is not essential that the backing store in memory has yet been updated with the identifier at the point when the monitoring circuitry later reads the identifier back after an event has occurred for the monitored address). For example the size of the identifier storage structure may be selected so that it does not occupy the entire capacity of a level one (or subsequent level) data cache so that there is room in the level one data cache for at least part of the identifier storage structure as well as a reasonable number of other data lines such as the cache lines corresponding to data at the monitored addresses. The approach where the identifier storage structure is a structure in memory (potentially cached) can be more efficient to implement in hardware.

The variant of the monitor exclusive instruction described above, which specifies the target address implicitly as the given address specified by a most recent exclusive status setting instruction, can be particularly useful for enabling the identifier storage structure to be implemented as a memory-based structure, since by avoiding the need to specify the target address itself as an operand of the monitor exclusive instruction, this frees up space in the instruction encoding for other information, such as a register field for identifying an address for identifying the base address of the identifier storage structure.

As mentioned above, the monitoring reporting indication made accessible to software when relevant events occur for the monitored set of addresses may have various forms, but in some cases may be relatively limited in the information provided, and could for example merely provide an indication that at least one event occurred for any of the monitored set of addresses, without specifically identifying more information about which address encountered the event. Hence, in some implementations it can be useful to support a monitored polling instruction which can provide more information about which addresses encountered the events. In response to the instruction decoder decoding a monitor polling instruction, at least one of the processing circuitry and the monitoring circuitry may make accessible to software monitor polling information indicative of which of the monitored set of addresses has encountered the one or more events. For example, the monitor polling information could be made accessible to software by writing it to a destination register identified by the monitor polling instruction. Software can then include further instructions which use that destination register as a source register, to process the monitor polling instruction and then determine how to respond depending on which of the monitored set of addresses encountered the event.

In implementations where the monitor exclusive instruction is able to specify a software-defined identifier, which is allocated to an identifier storage structure when the address allocation operation is successful as described above, then the monitoring polling information may also include the identifier value associated with at least one of the monitored set of addresses for which the one or more events were determined to occur by the monitoring circuitry. Hence, the identifier value associated with the monitored address for which events occurred need not necessarily be provided as the monitoring reporting indication provided initially to inform software that an event has occurred, but could be provided within the monitored polling information made available to software when the software subsequently executes the monitor polling instruction. To support this use case in implementations where the identifier storage structure is a memory-based structure, a variant of the monitor polling instruction could specify as one of its operands information for specifying the base address of the identifier storage structure, in the similar way to the monitor exclusive instruction specifying information for identifying this base address as discussed above.

Another piece of information that could be included in the monitor polling information can be a count value which indicates a number of addresses in the monitored set of addresses for which the one or more events occurred. In some cases this count value could indicate the total number of addresses for which the events occurred, or could indicate a number of remaining addresses in the monitored set of addresses for which the one or more evets occurred and the software has not yet triggered return of information about that particular address by executing a monitor polling instruction. For example, in some cases the monitor polling information returned in response to a single instance of the monitor polling instruction could return information about a single monitored address at a time, so if events occur for more than one of the monitored set of addresses, this may require multiple instances of the monitor polling instruction to be executed to return the identifier or other information about the updated addresses for which events occurred. For example the software could include a loop which iterates through for each monitored address for which events were determined to occur. Hence, by returning a count value indicating the total or remaining number of addresses still to be checked for which events occurred, this count value can be used by the software to determine whether it is still necessary to perform further iterations of the monitor polling operation.

The exclusive setting instruction can be any instruction which is capable of controlling the processing circuitry to set the exclusive status for a given address. However, in one example the exclusive status setting instruction is a load exclusive instruction. In response to the instruction decoder decoding the load exclusive instruction, the processing circuitry may load data associated with a given address to at least one destination register specified by the load exclusive instruction, and set the exclusive status associated with the given address. By supporting a load exclusive instruction which both sets the exclusive status and also loads data associated with the address for which the exclusive status is set, this can be useful for supporting atomic sets of operation such as the one discussed above for the configuration of the monitored set of addresses, since it is not necessary to issue separate instructions to load the data from a given address and mark it as exclusive.

The monitor exclusive instruction need not be the only type of instruction that uses the exclusive status that can be configured by an exclusive status setting instruction. Another type of instruction supported in the ISA may be a store exclusive instruction which specifies a store target address and at least one source register. In response to decoding of the store exclusive instruction by the instruction decoder, the processing circuitry may determine whether the exclusive status is associated with a store target address, and if so, store data from the at least one source register to a memory location associated with the store target address. Hence, the monitor exclusive instruction may reuse the same infrastructure for tracking exclusive status that may already be supported for handling load/store exclusive instruction pairs, so can be implemented at relatively little additional cost compared to architectures already supporting the load/store exclusive instructions.

The techniques discussed above may be implemented within a data processing apparatus which has hardware circuitry provided for implementing the instruction decoder, processing circuitry and monitoring circuitry discussed above. However, the same techniques can also be implemented within a computer program which executes on a host data processing apparatus to provide an instruction execution environment for execution of target code. Such a computer program may control the host data processing apparatus to simulate the architectural environment which would be provided on a hardware apparatus which actually supports a certain instruction set architecture, even if the host data processing apparatus itself does not support that architecture. Hence, the computer program may comprise instruction decoding program logic which decodes program instructions of the target code to control the host data processing apparatus to perform data processing in response to the program instructions of the target code (e.g. mapping each instruction of the target code to a sequence of one or more instructions in the native instruction set of the host which implements equivalent functionality). The instruction decoding program logic may support the monitor exclusive instruction and exclusive status setting instruction as discussed above. Also, the instruction decoding program logic may support the other instructions mentioned earlier (e.g. monitor polling instruction, load exclusive instruction, store exclusive instruction). The compute program may also include exclusive status clearing program logic which clears the exclusive status in a corresponding way to the clearing performed by the processing circuitry described above, and monitoring program logic which corresponds to the functionality of the monitoring circuitry described above. In the simulation program, accesses to memory may be emulated in a simulated fashion, as the address space addressed by the target code may be in a simulated address space which may not be the same as the host address space used by the host processor. Also, the simulation may simulate the registers defined by the simulated architecture using accesses to host storage of the host processor (e.g. host registers or host memory). Such simulation programs are useful, for example, when legacy code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be an non-transitory storage medium.

FIG. 1 schematically illustrates an example of a data processing system 2 (e.g. an integrated circuit or system-on-chip) which includes a number of requester devices 4, 6, 8 and an interconnect 10 for managing coherency between data cached in caches 12 of respective requester devices. The interconnect 10 also controls access to shared memory 14. As shown in FIG. 1 there could be more than one memory module 14 coupled to the interconnect 10 which can be accessed from any of the requester devices 4, 6, 8. In this example the requester devices include one or more processing elements 4, 6, which are elements supporting execution of instructions defined according to a particular instruction set architecture (ISA). The processing elements 4, 6 may include one or more caches 12 (although FIG. 1 only shows a single cache for conciseness, the cache could be implemented as a hierarchy of multiple levels of cache). The processing elements 4, 6 could for example be a central processing unit (CPU) for performing general purpose processing or a graphics processing unit (GPU) for performing graphics processing. The system may also include one or more requester devices 8 which may not have their own cache 12, but may have direct memory access (DMA) to memory 14 so that they can issue requests to access memory without being explicitly controlled to do so by the processing elements 4, 6. For example, a device 8 could be an input/output (I/O) device such as a network interface controller (NIC) for controlling transmission and reception of data over a network, display controller for controlling display of data on a screen, a direct memory access (DMA) controller for controlling transfer of data between memory and a peripheral device, to list just a few examples.

The interconnect 10 is responsible for maintaining coherency between data cached in the caches 12. A coherency protocol may be used to define the rules for governing how the system responds to one requester accessing a given address, to ensure that subsequent accesses to the same address from other requesters see data consistent with the outcome of the request from the first requester. For example, the coherency protocol may define a number of request and response messages and protocols for when different kinds of messages should be generated, as well as defining a number of coherency states which may be associated with data stored in caches 12 or in a system cache 16 provided within the interconnect 10 (the system cache 16 is shared between requesters and provides faster access to data compared to if the data has to be obtained from memory 14). For example, when one processing element 4 initiates a request to read or write data from a particular address in its cache 12, depending on the current coherency state this may trigger various requests to the interconnect which may send snoop requests to caches 12 in other requesters if necessary to query the coherency state of data at that requester's cache or trigger an invalidation of data from that requester's cache if necessary. In some cases the interconnect may have a snoop filter (which as shown in FIG. 1 could be combined with the system cache 16, but could also be a separate element) which may be used to at least partially track which requesters are caching data from a given address, to allow some snoop traffic to be eliminated if it is known that a certain requester's cache 12 does not cache data from a particular address. Any known coherency protocol can be used to maintain coherency. Examples of coherency protocols which could be used are the AMBA® 4 ACE and AMBA® 5 CHI coherency protocols provided by Arm® Limited of Cambridge, UK, however it will be appreciated that other coherency protocols could also be used to maintain coherency.

In a system such as the one shown in FIG. 1, interaction between different requesters may be performed by accessing shared data structures in the memory system. For example, if device 8 is a network interface controller, when data is received from the network then a queue of data could be updated based on the received packets. Software executing on one of the processing elements 4, 6 may wish to check those queues to check whether there is any data available to be processed and if so to carry out corresponding actions. If the number of queues to be monitored is not particularly large then it may be feasible for the software simply to periodically execute load instructions to read addresses in memory that are mapped to each queue and check whether anything has changed that requires processing. However, the number of queues to be monitored may be large, for example over 100, and so such polling of addresses in memory may incur a large overhead. Examples below discuss address monitoring functions which can be supported in the hardware-implemented architecture of the processing elements 4, 6 to reduce the performance cost and power cost of monitoring addresses in memory to check whether they have been updated. By providing some hardware which is able to be configured by software to monitor for updates to particular addresses, so that when any of those addresses are updated then an indication is provided to the software, this avoids the software explicitly needing to repeatedly read those addresses. If there is no other processing to be performed then this could allow a processing element 4, 6 to enter a power saving mode for a time, waiting for an event to be reported when one of the monitored addresses has been updated, so that power can be saved, which would not be possible if the software had to keep issuing explicit read requests to access location in memory corresponding to the monitored addresses.

While FIG. 1 shows a scenario where software executing on a processing element 4, 6 is waiting for a data structure to be updated by another requester device 8 such as a network controller, a similar address monitoring problem can arise when multiple software processes executing on the same processing element 4, 6 are communicating using updates to data at addresses in shared memory 14, so it is not essential that the monitoring is for changes by another requester device.

Figure 2:
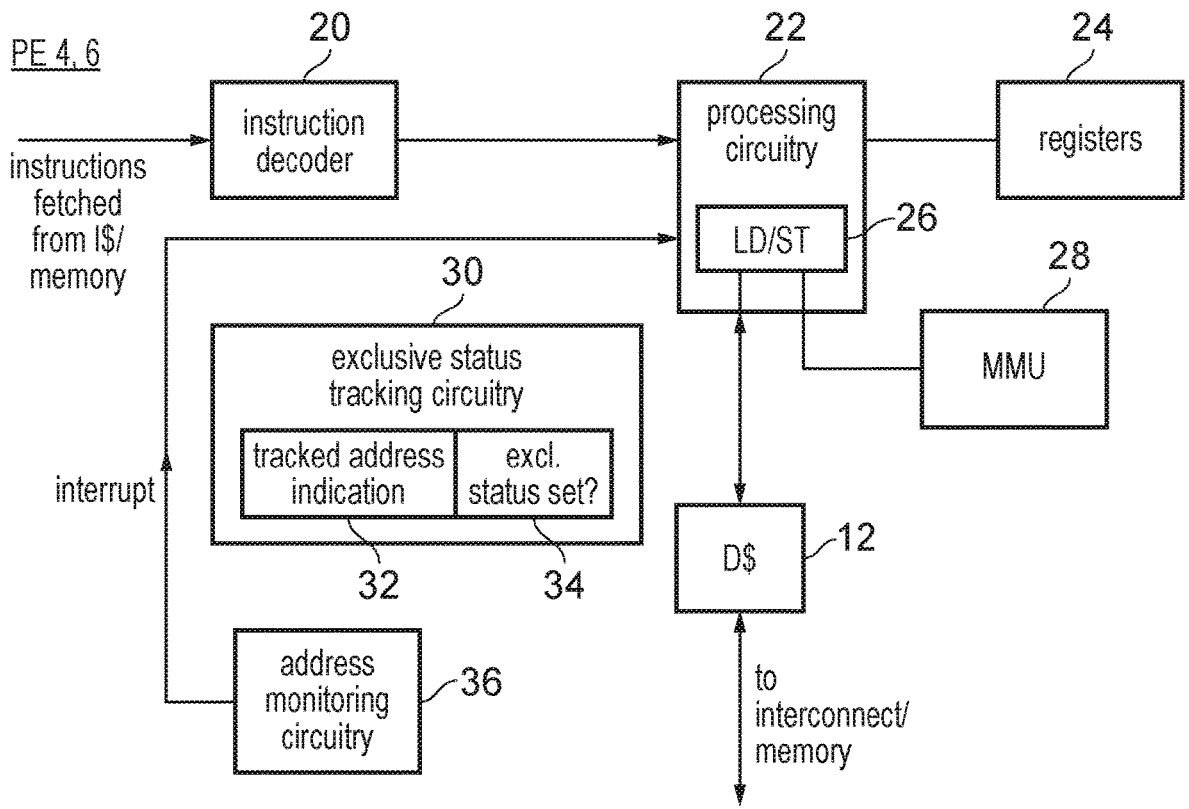
FIG. 2 illustrates an example of a processing element acting as one of the requester devices, which is provided with address monitoring circuitry.

FIG. 2 shows in more detail features of one of the processing elements 4, 6. It will be appreciated that it is not essential for all of the processing elements 4, 6 within a system to have the same design, e.g. it is possible to provide an asymmetric multiprocessor system including processing elements which support the same ISA but have different micro-architectural implementations. Hence, it is not essential for every processing element to have the features shown in FIG. 2. For example, not every processing element needs to include the address monitoring circuitry 36.

The processing element 4, 6 includes an instruction decoder 20 for receiving program instructions (defined according to a particular instruction set architecture) which have been fetched from memory 14 or from an instruction cache (the instruction cache is not illustrated in FIGS. 1 and 2, but may be provided within the processing element). The instruction decoder 20 decodes the fetched instructions to generate control signals for controlling processing circuitry 22 to perform operations represented by the instructions. The processing circuitry 22 has access to registers 24 which may be used for storing operands for instructions and results of instructions processed by the processing circuitry 22. The processing circuitry 22 may include a number of execution units for executing different types of instructions, such as an arithmetic/logic unit (ALU) for executing arithmetic or logical instructions, or a branch unit for executing branch instructions. For conciseness the different types of execution unit are not shown in FIG. 2, other than illustrating a load/store unit 26 for executing load instructions for loading data to the registers 24 from the memory system (including main memory 14 and any caches 12, 16), or store instructions for storing data from the registers 24 to the memory system 12, 14, 16. A memory management unit 28 may be provided for providing memory protection and/or address translation functions, to control which addresses in the memory address space are allowed to be accessed by particular software executing on the processing circuitry 22 and/or managing translation between virtual addresses specified by the software and physical addresses used to identify locations within the memory system. While FIG. 2 shows a single data cache 12 as an example of a cache of the processing element, it will be appreciated that it is possible for multiple levels of cache to be provided private to a particular processing element, such as a level 1 data cache and a level 2 cache (or additional levels of cache). Hence, references to the cache 12 may include a multi-level cache hierarchy.

The processing element has exclusive status tracking circuitry 30 for tracking an exclusive status associated with a particular address. The address selected for exclusive status can be selected by executing an exclusive status setting instruction on the processing circuitry 22 (e.g. a load exclusive instruction as described below with respect to FIG. 3). When an exclusive status setting instruction is executed specifying a given address, a tracked address indication 32 is stored indicating the given address, and an exclusive status indication 34 is set to indicate that the given address indicated by the tracked address indication 32 has the exclusive status. Subsequently, the exclusive status tracking circuitry 30 monitors for events which could indicate a conflicting memory access to the tracked address and if one is detected then the exclusive status is cleared by changing the state of the exclusive status indicator 34. Certain instructions may test whether the tracked address is still indicated as having the exclusive status and may control the processing circuitry 22 to perform an operation conditional on whether that address remains indicated as having the exclusive status. This can be useful for ensuring that certain sequences of instructions are executed atomically between an initial operation involving a tracked address and a subsequent operation, which can be useful for avoiding data race conditions when multiple requesters may make conflicting accesses to an address in memory leading to an effect of one of those accesses being lost or one of those accesses accessing potentially out of date data.

However, the exclusive status tracking circuitry 30 may be relatively limited in the number of addresses it can monitor, for example being limited to tracking a single address at a time. Hence, address monitoring circuitry 36 is also provided for performing monitoring of a wider set of monitored addresses and reporting to software when one of the previously configured set of monitored addresses has encountered an event indicating a potential update to the data at that address. For example, as shown in FIG. 2 the address monitoring circuitry 36 may send an interrupt signal to the processing circuitry 22 to interrupt processing currently being performed (or alternatively if the processing circuitry was in a power saving state, the interrupt may cause the processing circuitry to wake up), so that software may respond to the interrupt by executing instructions for identifying which address has changed state and carrying out subsequent processing based on which address was updated. This can be useful for supporting the queue monitoring use case discussed approve, but could also be used for other purposes. The address monitoring circuitry 36 will be discussed in more detail below, but first the exclusive status tracking is discussed in more detail.

Figure 3:
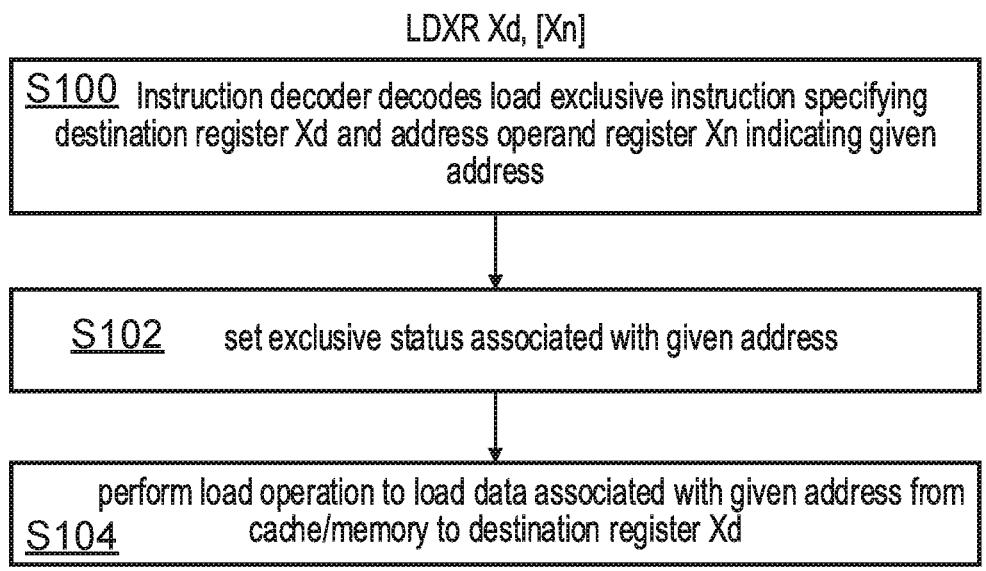
FIG. 3 illustrates processing of a load exclusive instruction.

FIG. 3 illustrates processing of a load exclusive instruction LDXR, which is an example of an exclusive status setting instruction. The load exclusive instruction specifies a destination register Xd and an address operand register Xn which stores a value indicating a given address. At step S100 of FIG. 3 the instruction decoder 20 decodes the load exclusive instruction. In response to the load exclusive instruction, the instruction decoder controls the processing circuitry 22 to perform the subsequent steps of FIG. 3. At step S102 the processing circuitry sets the exclusive status associated with a given address. For example, the tracked address indication 32 may be updated to specify information which allows the given address to be identified, and the exclusive status indicator 34 may be set to a particular value to indicate that the exclusive status is present. In some cases the tracked address indication 32 could be updated to specify the physical address corresponding to the given address. However, it is also possible for the tracked address indication to identify the given address indirectly, for example by identifying a particular entry within the data cache 12 that is associated with data for the given address. For example the tracked address indication 32 could be information specifying a cache set/way identifier for identifying the relevant entry in a cache implemented using a set-associative allocation policy. Such a format for the tracked address indication may in some implementations be simpler to compare against information returned from the cache when a snoop or coherency state transition is detected to a particular address, for identifying whether the exclusive status needs to be cleared. It will be appreciated that while the encoding of the load exclusive instruction and the exclusive status setting operation represented by that instruction may be specified in the ISA supported by the processing system, the exact format of the exclusive status tracking information 32, 34 used to track whether exclusive status is set for a particular address may not be prescribed by the architecture and could vary from implementation to implementation. Hence, the exact format of the information 32, 34 is not an essential feature. In general any information may be stored which may allow the system to determine whether the exclusive status is still set for a given address.

At step S104, in response to the load exclusive instruction the load/store unit 26 of the processing circuitry 6 performs a load operation, to load data associated with the given address from the cache 12 or memory 14 to the destination register identified based on the register specifier Xd specified in the load exclusive instruction. While steps S102 and 104 of FIG. 3 are shown in sequence it will be appreciated that other implementations could perform these steps in the opposite order or in parallel.

FIG. 3 shows a load exclusive instruction as an example of an exclusive status setting instruction. Some ISAs may also support an exclusive status setting instruction which allows the exclusive status to be set for an address, without also triggering a load of data associated with the target address.

Figure 4:
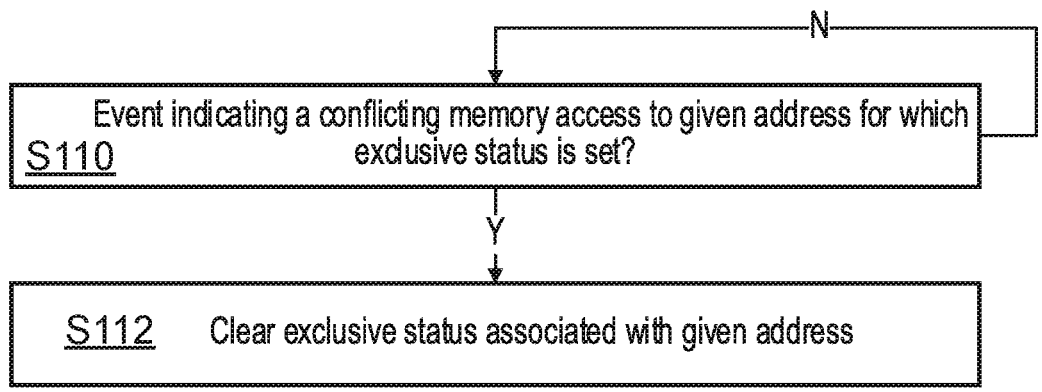
FIG. 4 illustrates clearing of exclusive status.

FIG. 4 illustrates steps performed by the exclusive status tracking circuitry 30 to maintain the exclusive status indicator 34 while monitoring for events which may indicate conflicting memory accesses. At step S110 the exclusive status tracking circuitry 30 detects whether an event has been detected indicating that a conflicting memory access may have been made to the given address indicated by the tracked address indication 32 for which the exclusive status is set. For example, this event could be the detection of a snoop request received from the interconnect 10 which indicates that another requester has requested writing of data to a location associated with a given address or has requested invalidation or cleaning of any cached data from the cache 12 which may have been cached associated with the given address. Also, the event indicating a conflicting memory access could be the invalidation of a cache entry in the data cache 12 associated with a given address (which could potentially have been triggered by a snoop from another device which may be updating the data for that address), or a certain transition in coherency state for a cache entry associated with a given address (e.g. a transition from an "exclusive" coherency state to a "shared" or "invalid" coherency state, where the "exclusive" coherency state indicates that the corresponding cached data can be updated by the requester owning that cache without issuing of snoops to the interconnect to check whether there is corresponding cached data in other caches 12, the "shared" coherency state indicates that the corresponding cached data is valid but updates to that cached data by the requester owning the cache would require a message to be sent to the interconnect 10 to allow checking of whether other requester's hold corresponding data, and the "invalid" coherency state indicates that the cache does not hold valid data for the corresponding address). Note that the "exclusive" coherency state mentioned here refers to one of a set of coherency states defined according to a coherency protocol used by the interconnect 10 and caches 12, 16, which is an orthogonal property to the exclusive status indicated by the exclusive status tracking circuitry 30. Hence, a cache entry could be marked as having the exclusive coherency state even if the corresponding address is not tracked as exclusive by the exclusive status tracking circuitry 30. Similarly, addresses could be tracked as exclusive by the exclusive status tracking circuitry 30 even if the corresponding cache data in a cache 12 is not marked as having the exclusive coherency state.

If any such event indicating a conflicting memory access to the given address for which the exclusive status is set is detected at step S110, then at step S112 the exclusive status tracking circuitry 30 clears the exclusive status for that address, by switching the state of the exclusive status indicator 34. This allows the processing circuitry to determine, for subsequent instructions which have an encoding indicating that they represent an operation to be performed conditional on the exclusive status still being set, that the operation should not be performed. This means that the performance of the conditional operation may be dependent on there having been no intervening memory access to the given address since the load exclusive instruction or other exclusive status setting instruction, which can be useful for implementing atomic sets of operations. It will be appreciated that the event indicating a conflicting memory access may not be the only type of event which could lead to the exclusive status being cleared for the tracked address. As the exclusive status tracking circuitry 30 may only have finite capacity to track exclusive status for a limited number of addresses (e.g. only a single address in the example of FIG. 2) then execution of another load exclusive instruction specifying a different address could result in the exclusive status for a previously tracked address being cleared because of overwriting the previously tracked address indication 32 with the indication for the new address. Also, if an interrupt or exception occurs then this could cause the exclusive status tracking circuitry 30 to clear the exclusive status for the previously tracked address. Hence, there could be other events which cause exclusive status to be lost, other than a conflicting memory access to the tracked address.

Figure 5:
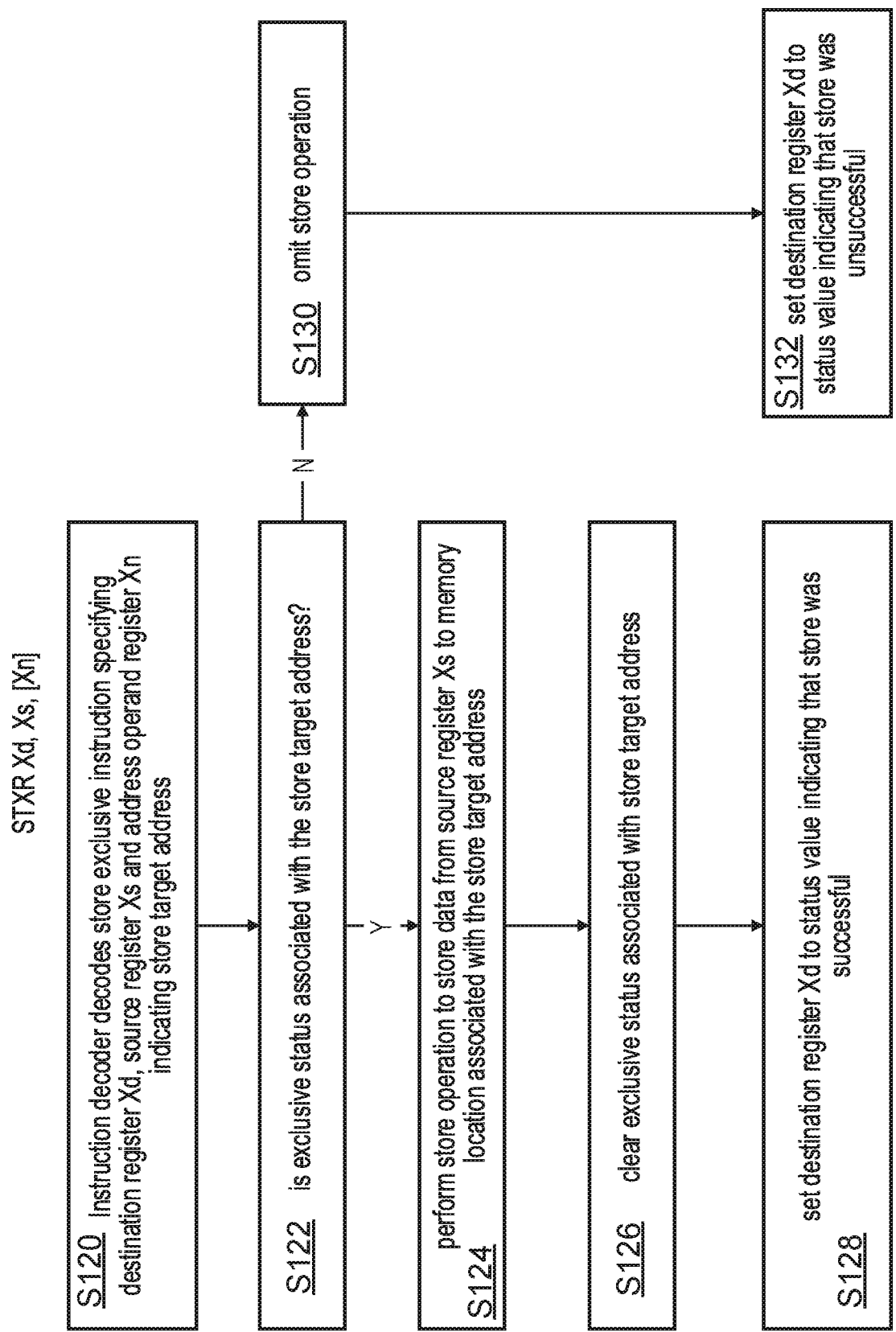
FIG. 5 illustrates processing of a store exclusive instruction.

FIG. 5 shows processing of a store exclusive instruction STXR, which can be used by software to request that the processing circuitry 22 performs a store operation to store data to a memory system location 12, 14, 16 identified by a store target address, with the store being conditional on that store target address still being identified as exclusive by the exclusive status tracking circuitry 30. At step S120 the instruction decoder 20 decodes the store exclusive instruction. The store exclusive instruction specifies a destination register Xd, a source register Xs, and an address operand register Xn. The address operand register stores a value which can be used to determine the store target address. In response to the store exclusive instruction, at step S122 the processing circuitry 22 is controlled to determine whether the exclusive status is still associated with the store target address. Hence, the information in the tracked address indication 32 can be compared with information derived from the store target address to determine whether the tracked address matches the store target address, and also the exclusive status indicator 34 is checked to determine whether it has the value indicating that exclusive status is set. If both the exclusive status is set and the store target address matches the address for which exclusive status is set, then at step S124 the load/store unit 26 proceeds to perform the store operation to store data from the source register Xs to a memory location associated with the store target address. At step S126 the exclusive status is cleared for the store target address, and at step S128 the destination register Xd is set to a status value which indicates that the store operation was successful. In contrast, if at step S122 it was determined that the store target address is not set as exclusive (e.g. the store target address did not match the tracked address indicated by tracked address indication 32 or if the exclusive status indicator 34 was cleared), then at step S130 the store operation is omitted and at S132 the destination register Xd is set to a status value indicating that the store operation was unsuccessful.

Hence, the status value written to destination register Xd can be used by software to determine whether the store was successful and hence whether it is needed to retry the store (and possibly earlier operations may need to be retried as well) or whether processing can then continue beyond the store. This can be useful for allowing a set of atomic operations to be defined, bounded by the load exclusive and store exclusive instructions, to ensure that the store only takes place if there has been no intervening memory access since the load.

Figure 6:
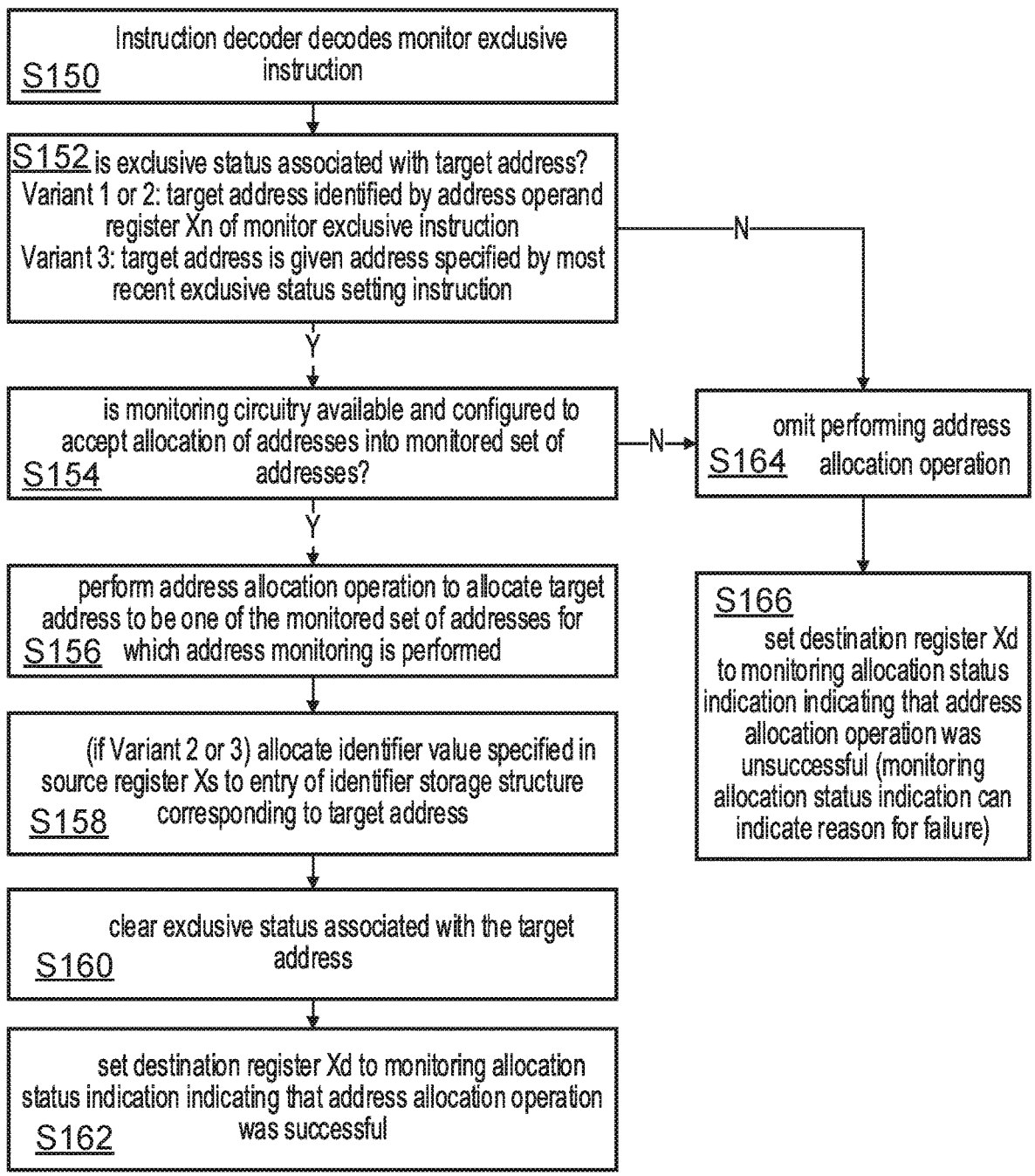
FIG. 6 illustrates a number of variants of a monitor exclusive instruction and a method of processing the monitor exclusive instruction.

The exclusive status tracked by exclusive status tracking circuitry 30 may also be used for a monitor exclusive instruction which can be used to allow software to configure the address monitoring circuitry 36 to monitor for updates to a particular address. FIG. 6 illustrates 3 alternative variants of the monitor exclusive instruction MONX. Different implementations may support different options, so any one or more of these variants could be supported in a given implementation.

In a first variant, the monitor exclusive instruction MONX specifies a destination register Xd to be updated with a status indication. Similar to the store exclusive instruction discussed above, the status indication may provide an indication of whether the monitor exclusive operation was successful or not, but unlike the store exclusive instruction discussed above, for the monitor exclusive instruction it is possible that the status indication may do more than just provide a binary indication of pass/fail, but in the case of failure could provide information about a reason for failure, potentially distinguishing between two or more different possible reasons for failure. In variant 1, the monitor exclusive instruction also specifies a register field identifying an address register Xn which stores information for determining the target address sought to be allocated to the monitored set of addresses to be tracked by monitoring circuitry 36.

For variant 2, the destination register Xd and the address register Xn are the same as in variant 1, but the monitor exclusive instruction also specifies an additional source register Xs which can be used to provide a software-defined identifier value which can be allocated to an identifier structure, so that when the monitoring circuitry 36 identifies that data has been updated for the monitored address, the software-defined identifier can be returned to allow software to identify which address changed.

Variant 3 of the monitor exclusive instruction MONX specifies the destination register and the source register Xd, Xs the same as in variant 2, but in variant 3 instead of indicating the target address itself, the address indicated using the address register Xn indicates information for identifying a base address of the identifier storage structure used to track the software-defined identifiers (as discussed further with respect to FIG. 9 below). In this example, the target address which is to be allocated into the monitored set of addresses is not encoded in the monitor exclusive instruction itself, but instead is implicit, being defined as the address specified by the most recently executed exclusive status setting instruction (e.g. the address specified by the most recent load exclusive instruction in a same thread as the monitor exclusive instruction). For example, the target address could be identified based on the tracked address indication 32 identified by the exclusive status tracking circuitry 30.

The flow chart in FIG. 6 illustrates processing of any of the three variants of the monitor exclusive instruction MONX. At step S150 the instruction decoder 20 decodes the monitor exclusive instruction and generates signals for controlling the processing circuitry 22 and other elements of the system such as the address monitoring circuitry 36 or exclusive status tracking circuitry 30 to perform the operation shown in the remaining steps of FIG. 6.

At step S152, in response to the monitor exclusive instruction, the processing circuitry determines whether the exclusive status is associated with a target address associated with the monitor exclusive instruction. For variants 1 and 2, the target address is identified based on the value stored in the address operand register Xn specified by the monitor exclusive instruction. For variant 3, the target address is the given address specified by the most recent exclusive status setting instruction. Hence, for variants 1 or 2 a comparison between the tracked address indication 32 and the target address of the monitor exclusive instruction may be performed to check whether they match and also the exclusive status indicator 34 may be checked to determine whether the target address has the exclusive status. For variant 3 it may be implicit that the target address of the monitor exclusive instruction will match the most recently tracked exclusive address, so for variant 3 checking the exclusive status indication 34 may be enough without an address comparison. Either way, if it is determined that the exclusive status is associated with the target address associated with the monitor exclusive instruction, then at step S154 the processing circuitry also determines whether the monitoring circuitry 36 is available and configured to accept allocation of addresses into the monitors set of addresses.

Some systems may support the address monitoring circuitry 36 being disabled or powered down to save power, and so it may not always be available. Also, in some cases, before being able to use the address monitoring circuitry 36 certain control parameters may need to be set up, so if that has not yet been done then the monitoring circuitry may not yet be configured to accept allocation of addresses into the monitored set of addresses.

If at step S154 the monitoring circuitry is determined to be available and configured to accept allocation of addresses into the monitored set of addresses, then at step S156 the address allocation operation can be performed and so the target address can be allocated to be one of the monitored set of addresses for which address monitoring is to be performed by address monitoring circuitry 36. If the monitor exclusive instruction is variant 2 or 3, then at step S158 the processing circuitry also allocates an identifier value read from the source register Xs of the instruction to an entry of an identifier storage structure that corresponds to the target address. As discussed with respect to FIGS. 8 and 9 below, there may be different ways of implementing this identifier storage structure. Also, in the case where the address allocation operation can be performed, then at step S160 the exclusive status tracked by exclusive status tracking circuitry 30 is cleared for the target address (as the monitor exclusive instruction has completed the atomic set of operations being managed using the exclusive status indication). Also, at step S162 the destination register Xd of the instruction is set to a monitoring allocation status indication indicating that the address allocation operation was successful.

On the other hand, if at step S152 it was determined that the target address did not have the exclusive status, or at step S154 the monitoring circuitry was unavailable or not configured to accept allocation of addresses then at step S164 the address allocation operation is omitted and so none of steps S156, S158, S160 and S162 would be performed and instead at step S166 the destination register Xd is set to the monitoring allocation status indication having a different value indicating that the address allocation operation was unsuccessful.

In some cases the monitoring allocation status indication could be a single-bit value which may have one value (e.g. 0) indicating a successful address allocation operation and another value (e.g. 1) indicating an unsuccessful address allocation operation.

However, it is also possible to provide a multi-bit allocation status indication which may provide more information about a reason for failure in the case when the address allocation operation could not be performed. For example, if the monitoring allocation status indication is set to zero then this could indicate a successful address allocation operation, while non-zero values may indicate different reasons for failure. For example, the monitoring allocation status indication could be set to 1 if the address allocation operation failed because the exclusive status was determined not to be associated with the target address, while monitoring allocation status indications of 2 or more could be used for other reasons such as the monitoring circuitry being determined to be unavailable or unconfigured at step S154 or, in the case of variants 1 or 2, the target address of the monitor exclusive instruction not matching the address tracked by the tracked address indication 32 for the exclusive status tracking circuitry 30. Of course, other encodings of the monitoring allocation status indication could be used.

While FIG. 6 shows a sequential sequence of steps, it will be appreciated that steps could be reordered or performed in parallel. For example, steps S152 and S154 could be swapped or performed in parallel. Also, the various operations at steps S156, S158, S160, S162 performed when the allocation operation is successful could be performed in any order, or with two or more of these steps in parallel.

This monitor exclusive instruction can be useful for allowing software to perform more complicated checks than merely comparing a single value at a given address in order to determine whether a particular address needs monitoring in the set of monitored addresses. For example, this could be useful for testing multiple elements of a data structure to work out if a particular software queue in memory requires monitoring. Such more complex checks may require a relatively flexible comparison operation which may not be able to be performed in a single instruction. This may create a challenge on how to perform those comparisons atomically as if data needs to be read from memory to perform the checks then by the time the checks are complete the resulting conclusion may only be reliable if no other requester has updated some of the relevant data in the meantime.

Hence, by defining instruction set architecture support for the monitor exclusive instruction described here, software can now define a series of code as follows:

A load exclusive instruction as discussed above can be used to load data to be checked, and mark the relevant address as exclusive;

One or more further instructions can be implemented to define the relevant comparison operations. For example this may include various arithmetic instructions, logical instructions, or compare instructions.

If the comparison operations are successful, a monitor exclusive instruction can then be used to promote the address associated with the load exclusive operation into the address monitoring facility 36 on condition that that address is still marked as having the exclusive status.

The monitor exclusive instruction need not be the only instruction supported by instruction decoder 20 and processing circuitry 22 for allocating addresses into the monitored set of addresses. It may also be possible to support an instruction which allocates an address to the monitored set without being dependent on whether that address has the exclusive status, which can be used on occasions where setting of the monitored address does not depend on an atomic set of operations comparing state data in memory.

Figure 7:
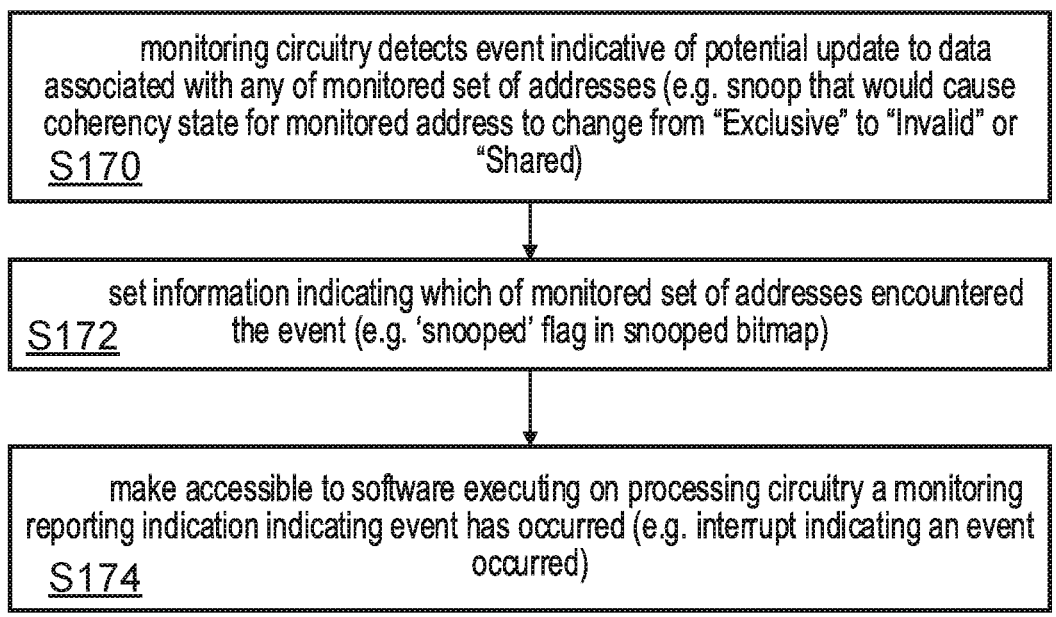
FIG. 7 illustrates monitoring for potential updates to data associated with a monitored set of addresses.

FIG. 7 illustrates monitoring by the address monitoring circuitry 36. At step S170 the monitoring circuitry 36 detects an event indicative of a potential update to data associated with any of the monitored set of addresses that has previously been configured. For example the event detected by the monitoring circuitry could be receipt of a snoop request from the interconnect 10 that indicates that coherency state for a monitored address should change from "exclusive" to either "invalid or "shared, or the detection of such a coherency state transition in the cache 12. In response to detecting the event, at step S172 the monitoring circuitry sets information indicating which of the monitored set of addresses encountered the event detected at step S170. For example, as shown below the address monitoring 36 could maintain a data structure either in hardware or using data stored in memory which tracks which of the monitored set of addresses is the address which encountered the event. At step S174 the address monitoring circuitry 36 makes accessible, to software executing on the processing circuitry 22, monitoring reporting information indicating that the event has occurred. For example, this may be the generation of an interrupt which may cause the processing circuitry 22 to wake up from a power saving state, or switch to processing of an interrupt handler, so that the software requiring the addresses to be monitored can then respond to the update.

The interrupt indicated to indicate that an event has occurred need not be generated every time an event has occurred. For example, if after having already raised the interrupt and before the processing circuitry has handled the interrupt, a further event is detected for one of the monitored set of addresses before the interrupt has been cleared, then it may not be necessary to generated a second interrupt. Also, in some implementations another mechanism may be used for informing software that an event has occurred for a monitored address, other than raising an interrupt. For example, information could be stored to a register which can be read by software. However, the interrupt based mechanism can be useful to allow processing circuitry 22 to use a "wait for event" instruction to signal that the processing circuitry 22 should enter a power saving mode until the interrupt is received indicating that an event has occurred for one of the monitored addresses. This could be useful if the processing circuitry 22 has no other functional processing to perform until an event has occurred for one of the monitored addresses.

Figure 8:
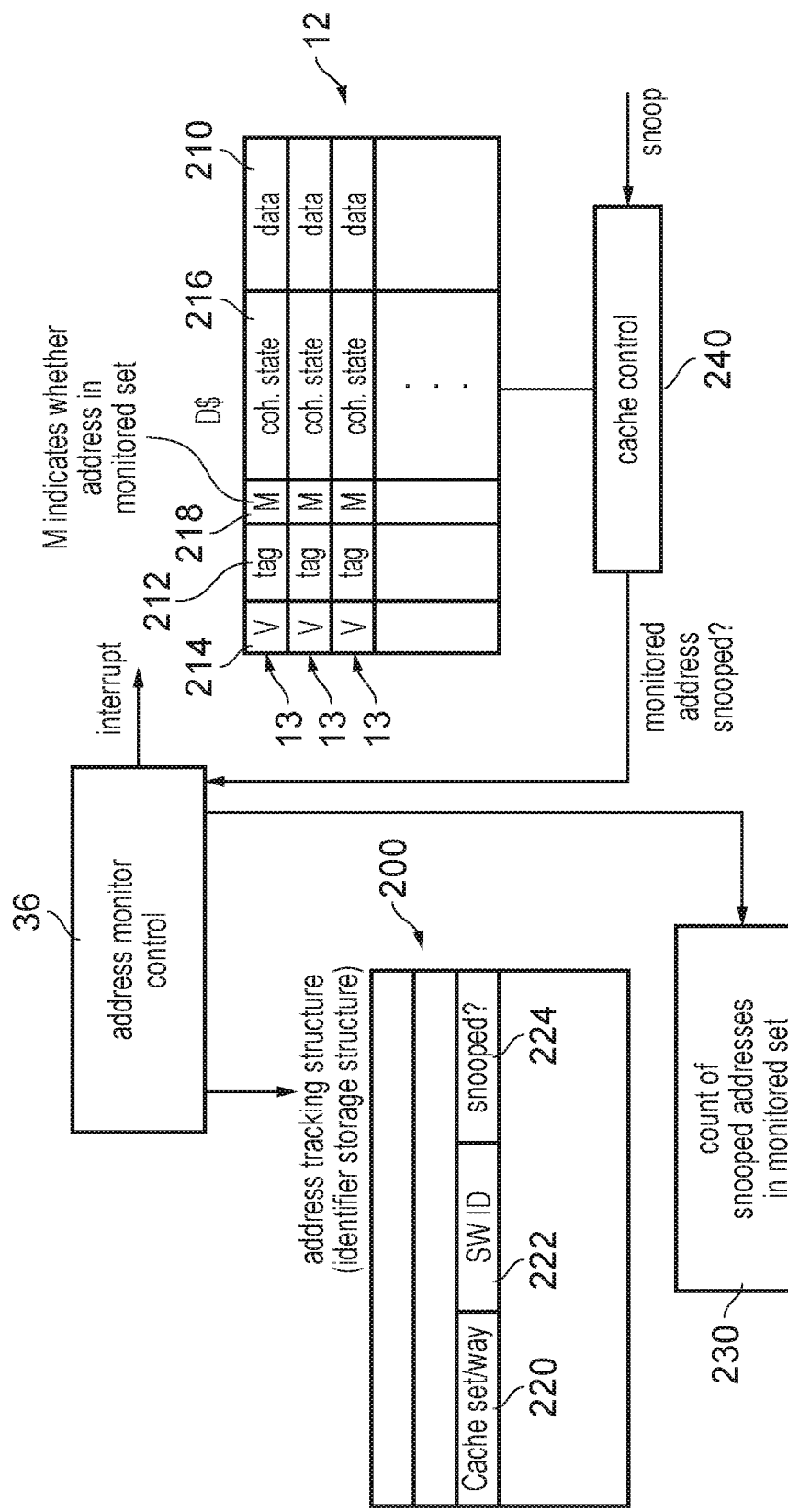
FIGS. 8 and 9 show alternative examples of address tracking structures for use in address monitoring.
Figure 9:
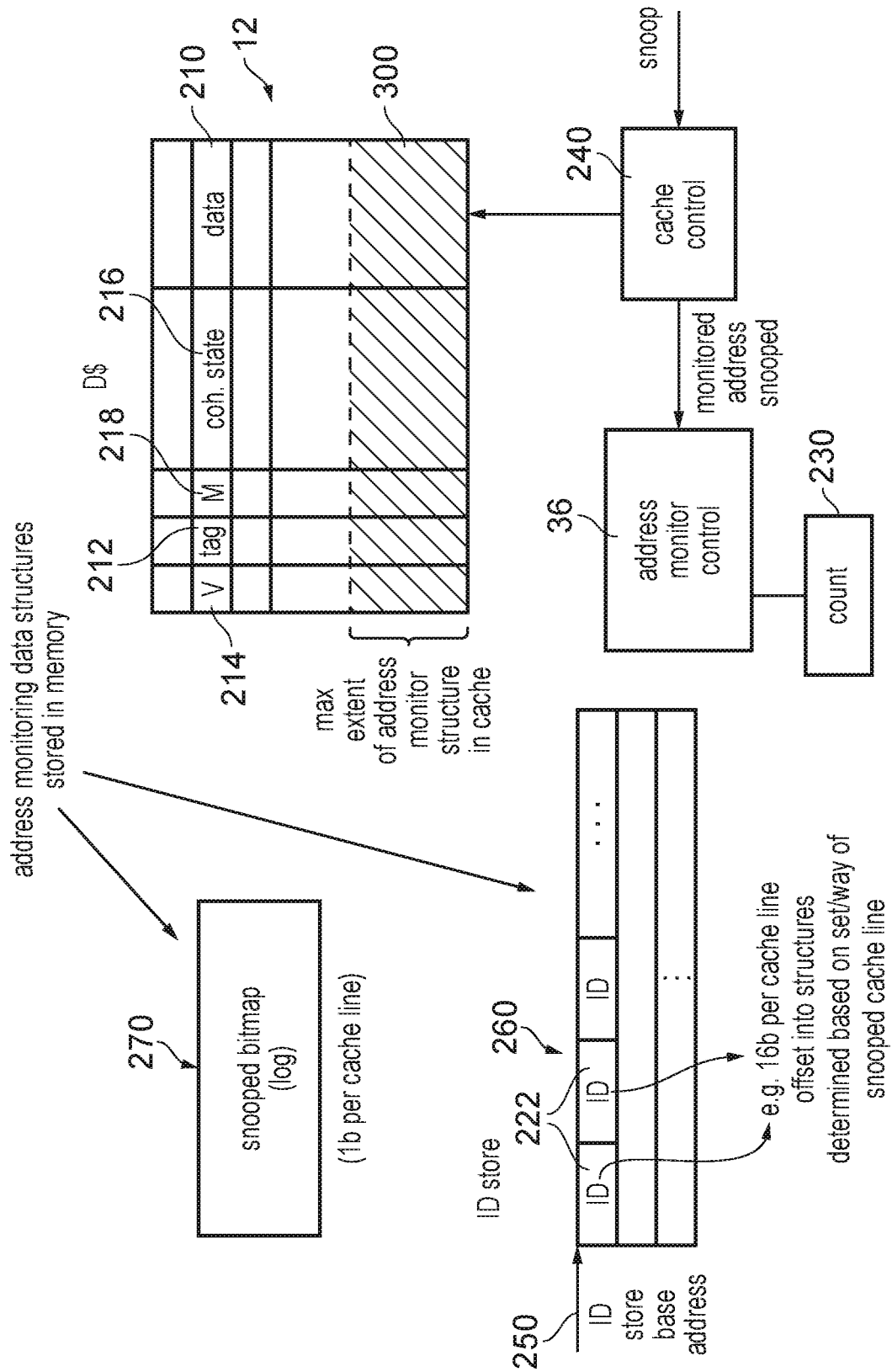

FIGS. 8 and 9 show different ways of implementing the address monitoring circuitry 36 and the various structures for tracking monitored addresses. It will be appreciated that these are just two examples and there could also be other ways of structuring the information for tracking which addresses are being monitored and among those addresses which addresses have encountered events.

FIG. 8 shows a first approach which may be used for implementations which use variants 1 or 2 of the monitor exclusive instruction, where there is no support for specifying an address in memory for providing a metadata structure for tracking of information about the monitored addresses. Hence, in the approach shown in FIG. 8 a dedicated buffer 200 may be provided in hardware to act as the address tracking structure for tracking information on the monitored addresses. Also, the address monitoring circuitry 36 may use state information stored within the data cache 12 to monitor for updates to data associated with certain addresses.

In this example, the data cache 12 includes a number of entries 13 which each can cache data 210 from a particular address in the memory system. A tag value 212 is stored with each entry to indicate information for identifying the address associated with the corresponding data and a valid flag 214 can be provided in each entry to indicate whether the data is valid. Also each entry 13 may specify a coherency state 216 used to identify whether the data is clean or dirty or whether it is in the exclusive or shared coherency state as discussed above. In some cases the coherency state 216 and valid flag 214 could be combined into a single indicator (with "invalid" being regarded as one of the coherency states indicated by the coherency state field 216).

As shown in FIG. 8, each cache entry can also be provided with a "monitored" indication 218 which indicates whether the address associated with that cache entry is in the monitored set of addresses which has previously been configured by execution of monitor exclusive instructions or other instructions for allocating addresses into the monitored set. Hence, in this example when step S156 of FIG. 6 is performed, this may include setting the monitored indication 218 in the cache entry that corresponds to the data associated with the target address, to indicate that the target address is in the monitored set of addresses.

The address monitoring circuitry 36 also maintains the address tracking structure 200 as a separate cache structure separate from the data cache 12 itself, for tracking further information about each monitored address. For example the address tracking structure could have a certain number of entries each corresponding to a particular cache entry 13 that has been indicated as corresponding to a monitored address. The number of entries in the address tracking structure 200 may not be as large as the number of entries in the cache 12. Each entry of the address tracking structure could, for example, specify a cache entry identifier 220 which identifies the corresponding cache entry, a software identifier 222 which may be the identifier allocated to the identifier storage structure at step S158 of FIG. 6 for the corresponding address, and a "snooped" indication 224 which may indicate whether or not a relevant event (e.g. coherency state transition triggered by a snoop has) been detected for the corresponding monitored address. The address monitoring circuitry 36 could also maintain a count value 230 which tracks how many addresses in the monitored set have encountered snoop events indicating that the corresponding addresses have been updated.

Hence, when allocating an address into the set of monitored addresses, the corresponding monitored indication 228 may be set in the relevant cache entry and also the software defined identifier value may be allocated to a corresponding entry of the address tracking structure 200. The field 220 of the relevant address tracking structure entry could be set to cache set/way information which identifies the position of the corresponding cache entry within the data cache 12 for example. If variant 1 of the monitor exclusive instruction is executed then no software identifier 222 needs to be supported.

On the other hand, when a snoop received from interconnect 10 is detected by the control circuit logic 240 associated with the data cache, then the cache control logic 240 may check the data cache 12 to determine whether there is a corresponding entry associated with the address specified by the snoop request (by comparing the tag fields 212 of one or more cache entries). If the address specified by the snoop request matches a valid cache entry for which the monitored indication 218 has been set to indicate that the corresponding address is part of the monitored set of addresses, then the address monitoring circuitry 36 generates the interrupt or other notification to software to indicate that an event has occurred and increments the count 230 of the number of snooped addresses that have been detected within the monitored set. Also, the address monitoring circuitry 36 updates the snooped indication 224 in the entry of the address tracking structure 200 which corresponds to the monitored address that was snooped. This allows a subsequent monitor polling instruction to check which particular address was snooped and obtain the corresponding software ID 222.

The approach shown in FIG. 8 can be useful to avoid consuming space in memory for address tracking, but may require hardware implementations to provide an additional address tracking structure. Alternatively, while FIG. 8 shows the address tracking structure 200 as separate from the data cache 12 other implementations could provide each cache entry 13 with additional fields for tracking the software ID 222 and the snooped indication 224. Either way, this may require additional circuit hardware to be provided.

FIG. 9 shows an alternative approach where instead the address monitoring data structures can be stored in the memory system itself (and if necessary cached in the data cache 12) so that there is no need to provide this additional hardware structure 200. This can be supported in implementations which support variant 3 of the monitor exclusive instruction above, where the instruction uses its address register Xn to identify information for specifying a base address 250 of an identifier storage structure 260 stored in the memory system. The identifier storage structure 260 may store the software identifiers 222 for corresponding monitored addresses that are allocated by variant 3 of the monitor exclusive instruction. The identifier structure 260 could include an identifier per cache line in the data cache 12, and indexing into this structure may use an offset relative to the base address that is determined based on the entry of the data cache 12 that is snooped (or the entry to which a monitored address is allocated, when the identifier 222 is stored to the structure 260 at the time of allocating the address for monitoring). The address monitoring circuitry 36 could also maintain a "snooped" bitmap 270 of "snooped" flags indicating whether each monitored address has been snooped or otherwise encountered events requiring reporting to software, as a further data structure 270 stored in memory and which may be stored at an address which may be also determined relative to the identifier store base address 250 specified for a given monitoring instruction. For example the snooped bit map 270 could follow on contiguously from the end of the identifier store 160.

Hence, with this approach the data cache 12 itself can be implemented with similar fields to those indicated in FIG. 8, including the monitored field 218 which tracks whether a given cache line is monitored or not. When a new address is allocated into the monitored set, then as well as setting the monitored field 218 for the relevant cache entry, the cache set/way ID of that cache entry can be used to derive an offset to be added to the base address 250 of the identifier store and a memory location having an address corresponding to the sum of that base address and offset can be updated with the software provided identifier provided by variant 3 of the monitor exclusive instruction.

When the cache controller 240 detects a snoop from the interconnect 10 which causes a cache entry marked as being monitored to change coherency state 216 from exclusive to either shared or invalid, then this is signalled to the address monitoring circuitry 36 which (as well as interrupting the processing circuitry 22) increments its count 230 of the number of monitored addresses which have been snooped and also updates the relevant snooped indicator within bitmap 270 to indicate the particular monitored address which has been snooped. Again, the relevant offset for identifying the flag within the snooped bitmap 270 which is to be updated may be derived from the set and way of the cache entry which corresponds to the monitored address that was snooped. When a monitor polling instruction discussed further below is executed to poll information about any addresses which may have encountered events, then the snooped bit map 270 can be parsed to identify the positions within the identifier store 260 for which software identifiers should be returned to software corresponding to the monitored addresses that encounter events.

The approach shown in FIG. 9 means that there is no need to incur circuit area cost in implementing a dedicated hardware structure for address tracking, such as structure 200 shown in FIG. 8. The size of the structures needed to be stored in memory can be relatively small in comparison to the overall amount of data cached in data cache 12 so that there is space in the data cache 12 for storing the address monitoring structures 260, 270 and also storing a reasonable number of the monitored cache lines themselves which helps to improve performance. For example, assuming a 64 kB cache, this may have 1024 cache lines that could be monitored. If it is desired to associate a software-provided identifier with each of these cache lines then this would require at least 10 bits for the identifier to be able to distinguish the 1024 different cache lines, so for example a 2-byte (16-bit) identifier may be used. Assuming 16-bit identifiers then the identifier structure 260 may occupy 2 kB of memory space and so this can easily fit within the 64 kB cache. Some additional space in the cache may also be required for the snoop bitmap 270 which may correspond to 128 bytes (1024×1 bit per snooped flag). In some instances, the count value 230 could also be pushed out to memory and cached, but still there may be plenty of additional space left in the level 1 data cache for monitored cache lines. This is indicated by the shaded portion 300 in FIG. 9 which may indicate a portion of the cache which corresponds to the maximum extent of the various address monitoring structures, leaving other portions for monitored cache lines and other data for addresses not being monitored. It will be appreciated that although FIG. 9 shows this shaded portion as a single contiguous block, in practice the address monitoring structures could be cached in a number of discontinuously-positioned entries of the cache.

The variant 3 instruction shown above is particularly useful for supporting the use case shown in FIG. 9. In variant 3, by defining the target address implicitly with reference to the address specified by the most recently encountered exclusive status setting instruction, this frees up space in the instruction encoding for a register field to instead provide the base address 250 of the identifier storage structure, so that the approach shown in FIG. 9 can be used. However, in other examples even if the target address is explicitly encoded in the instruction then if there is also sufficient space for a further register field to identify the identifier structure base address, then examples of the monitor exclusive instruction encoded with an explicitly indicated target address could also use the approach shown in FIG. 9 providing a data structure in memory for tracking the software IDs.

Also, while in the examples discussed above, in the variant 3 monitor exclusive instruction the address in register Xn identifies the base address 250 of the identifier storage structure 260, in other examples the value in this register could provide other information which allows the identifier store base address to be determined. For example, when the snooped bitmap 270, count value 230 and identifier storage structure 260 are located at fixed offsets relative to each other within the address space, then the value in the register specified by the monitor exclusive instruction could point to any one of these structures and the address of other structures could be derived from the address in the register Xn and the implicitly defined fixed offsets.

Figure 10:
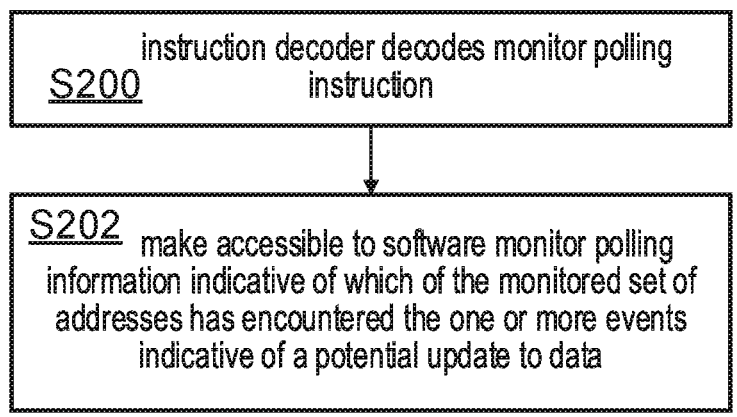
FIG. 10 illustrates two variants of a monitor polling instruction and a method of processing the monitor polling instruction.

FIG. 10 illustrates processing of a monitor polling instruction which can be used by software to request the monitoring circuitry 36 to return information about any of the monitored addresses for which an event was detected. FIG. 10 shows two variants of the monitored polling instruction. For the first variant the instruction specifies a destination register Xd to which the monitor polling information is written in response to the monitor polling instruction. In the second variant the monitor polling instruction specifies, in addition to the destination register Xd, an address register Xn providing the information for identifying the base address of the identifier storage structure 260 discussed with respect to FIG. 9. Variant 2 can be supported in instances where it is desirable to store the identifier storage structure in memory instead of providing a dedicated hardware structure as in FIG. 8. Variant 1 can be used with the implementation shown in FIG. 8.

For both variants, at step S200 the instruction decoder 20 decodes the monitored polling instruction, and in response controls the processing circuitry at step S202 to make accessible to software monitor polling information indicative of which of the monitored set of addresses has encountered the one or more events indicative of a potential update to data. The monitor polling information can be written to the destination register Xd specified by the monitor polling instruction.

Hence, the monitor polling instruction can be provided, that software can execute after it has received the interrupt from address monitoring circuitry 36 informing the software of an update to any one of the monitored set of addresses. As the interrupt does not itself distinguish which particular address has had the update, the monitor polling instruction can be used to return monitor polling information to a destination register which indicates more information about which address was updated.

In some implementations it may be possible for the monitor polling information to provide information about multiple different addresses in the monitored set of addresses, in cases where more than one address has encountered an event. However, in practice this information may not fit within one register and also it may not be efficient, in a single instruction, to gather the respective software IDs or other information about multiple addresses (for reasons of circuit implementation and timings), so in one example, the monitor polling instruction may be intended to return a single log of data associated with a single monitored address for which an event occurred, and a loop comprising multiple monitor polling instructions may be required if it is necessary to read out information from the address monitor for multiple addresses.

Figure 11:
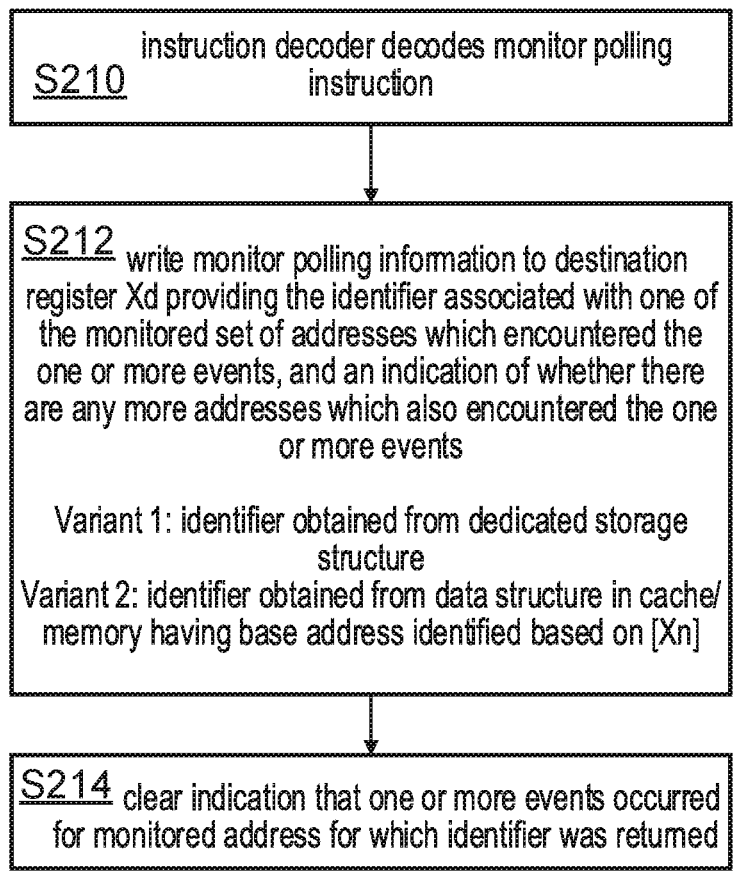
FIG. 11 illustrates in more detail processing of the monitor polling instruction.

FIG. 11 shows more detail for processing of the monitor polling instruction in the case where it is assumed that the monitor polling information will only return information about one monitored address even if multiple monitored addresses have encountered events. At step S210 the instruction decoder again decodes the monitor polling instruction. In response at step S212 the address monitoring circuitry 36 checks the snooped indicators 224 in the address tracking structure 200 of FIG. 8 or the snooped bitmap 270 of FIG. 9, to identify the next address in the monitored set for which an event was detected during monitoring. The address monitoring circuitry reads out the corresponding software identifier 222 (either from an entry of the address tracking structure 200 provided as a dedicated storage structure in hardware, or from a relevant offset in the identifier data structure 260 stored in memory or the cache 12). In the case of the memory-based structure 260, the offset within the identifier structure 260 corresponds to the position of the snooped bit that was read from the snooped bitmap 270. The software ID is included in the monitor polling information written to the destination register Xd of the monitor polling instruction. It is also possible to include other information as shown below in one example. For example, it can be useful to provide an indication of whether there are any more addresses which encountered one or more events, other than the address for which the software identifier is being returned, to allow software to decide whether it is necessary to execute any further instance of the monitor polling instruction.

At step S214 the processing circuitry also, in response to the decoding of the monitor polling instruction, clears the indication that one or more events occurred for the particular monitored address for which the identifier was returned at step S212 (e.g. the snooped field 224 of the relevant entry of the address tracking structure 200 is cleared or the corresponding bit within the bitmap 270 is cleared). Also, in cases where the count 230 is tracking the number of remaining addresses which have not yet been polled by monitor polling instructions, then at step S214 the count 230 could also be decremented so that once the count returns to 0 the software will determine that there are no remaining addresses to be polled.

An example format for the monitor polling information returned in destination register Xd can be as follows:

|63:48 monId|47:32 log Len|31:16 monLen|15:0 status|
From this the software can read:

- monId—either the identifier 222 associated with the first entry associated with an address marked as snooped, or if an error has occurred for some reason, a known default value (e.g. 0xffff)
- log Len—the number of remaining addresses marked as snooped, inclusive of the address for which the identifier 222 was returned from the address tracking structure 200, 260.
- monLen—the total number of addresses in the monitored set of addresses.
- status—status information indicating whether the monitor polling operation was successful (e.g. 0 for ok, and 1 for error—it may also be possible to indicate multiple reasons for error using different encoding of the status field).

Of course this is just one example and other implementations may return different types of monitor polling information or in a different format.

Figure 12:
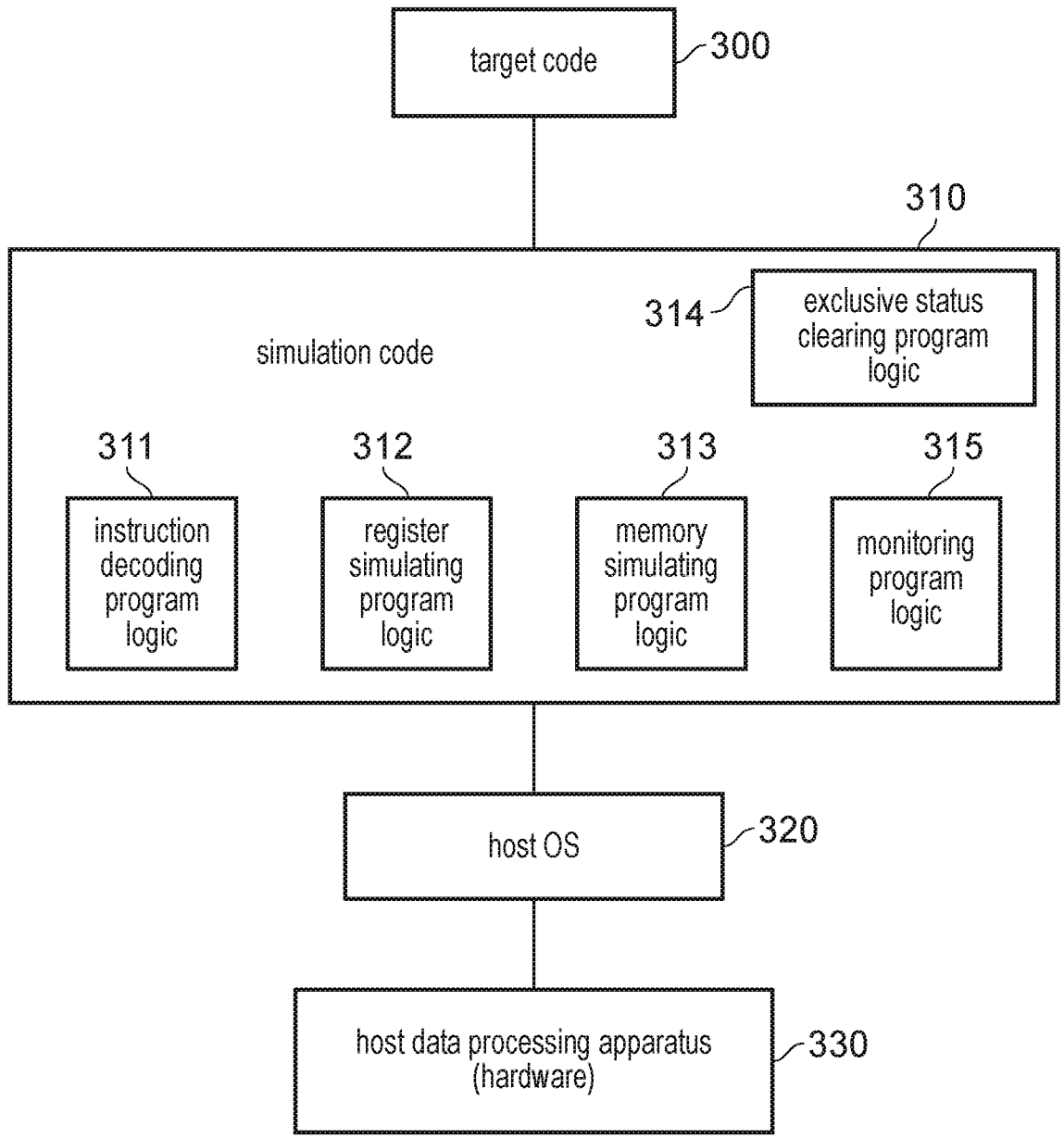
FIG. 12 illustrates a simulation example.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the interface of the hardware architecture being modelled by the simulator program 310. Thus, the program instructions of the target code 300, including the monitor exclusive instruction, monitor polling instruction, exclusive status setting instruction (e.g. load exclusive instruction) and store exclusive instruction described above, may be executed from within the instruction execution environment using the simulator program 310, so that a host computer 330 which does not actually have the hardware features of the apparatus 2 discussed above can emulate these features.

The simulator program 310 may have instruction decoding program logic 311 which comprises instructions which check the instruction encoding of program instructions of the target code 300, and map each type of instruction onto a corresponding set of one or more program instructions in the native instruction set supported by the host hardware 330 which implement corresponding functionality to that represented by the decoded instruction. The instruction decoding program logic 311 supports decoding of the various types of instructions described above.

The simulator program 310 also includes register simulating program logic 312 which may comprise sets of instructions which maintain a register simulating data structure in host storage (e.g. the virtual address space of the host data processing apparatus 330 or registers of the host data processing apparatus 330). The register simulating data structure represents the register contents of the registers 24 which the target code expects to be provided in hardware, but which may not actually be provided in the hardware of the host apparatus 330. Instructions in the target code 300, which in the simulated instruction set architecture which are expected to reference certain registers, may cause the register simulating program logic 312 to generate load/store instructions in the native instruction set of the host apparatus, to request reading/writing of the corresponding simulated register state from the register simulating data structure stored in the memory of the host apparatus. Similarly, the simulation program 310 may include memory simulating program logic 313 to implement virtual-to-physical address translation (based on page table data) between the virtual address space used by the target code 300 and a simulated physical address space which, from the point of view of the target code 300 is expected to refer to actual physical memory storage, but which in reality is mapped by memory simulating program logic 313 to regions of virtual addresses within the virtual address space used by the real host data processing apparatus 330 (which may itself then be subject to further address translation into the real physical address space used to reference the host memory).

Also, the simulation code includes exclusive status clearing program logic 314 and monitoring program logic 315 which comprise sets of software instructions which control the host hardware 330 to perform the functions equivalent to the exclusive status tracking circuitry 30 and address monitoring circuitry 36 respectively.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
an instruction decoder to decode instructions;
processing circuitry to perform data processing in response to the instructions decoded by the instruction decoder; and
monitoring circuitry to monitor one or more events indicative of a potential update to data associated with any of a monitored set of addresses, and to make accessible to software executing on the processing circuitry a monitoring reporting indication indicative of whether any of the one or more events has occurred for at least one of the monitored set of addresses; in which:
in response to the instruction decoder decoding an exclusive status setting instruction specifying a given address, the processing circuitry is configured to set an exclusive status associated with the given address;
the processing circuitry is configured to clear the exclusive status associated with the given address in response to detecting an event indicative of a conflicting memory access to the given address; and
in response to the instruction decoder decoding a monitor exclusive instruction, the processing circuitry is configured to:
determine whether the exclusive status is associated with a target address; and
when the exclusive status is determined to be associated with the target address, allocate the target address to be one of said monitored set of addresses for which the one or more events are to be monitored by the monitoring circuitry;
in which, in response to the instruction decoder decoding the monitor exclusive instruction, the processing circuitry is configured to return a monitoring allocation status indication accessible to software, the monitoring allocation status indication indicative of whether the target address was successfully allocated to be one of said monitored set of addresses in response to the monitor exclusive instruction.

2. The apparatus according to claim 1, in which, when allocation of the target address to be one of said monitored set of addresses is unsuccessful, the monitoring allocation status indication is indicative of a reason for failure of the allocation of the target address.

3. The apparatus according to claim 2, in which the monitoring allocation status indication distinguishes between at least two of the following reasons:
the exclusive status no longer being set for the target address;
the exclusive status being set for an address other than the target address; and
the monitoring circuitry being unavailable or not yet configured to accept allocation of addresses into the monitored set of addresses.

4. The apparatus according to claim 1, in which the monitor exclusive instruction specifies the target address.

5. The apparatus according to claim 1, in which the target address comprises an address specified as the given address by a most recent exclusive status setting instruction prior to the monitor exclusive instruction.

6. The apparatus according to claim 1, in which:
in response to the instruction decoder decoding the monitor exclusive instruction, when the exclusive status is determined to be associated with the target address, the processing circuitry is configured to allocate, to an entry of an identifier storage structure corresponding to the target address, an identifier value specified as an operand of the monitor exclusive instruction.

7. The apparatus according to claim 6, in which the identifier storage structure comprises a dedicated address monitoring tracking structure comprising a plurality of entries, each entry for tracking information associated with a corresponding one of the monitored set of addresses.

8. The apparatus according to claim 6, in which the identifier storage structure comprises a data structure stored in memory.

9. The apparatus according to claim 8, in which the monitor exclusive instruction specifies information for identifying a base address of the identifier storage structure.

10. The apparatus according to claim 6, in which the monitoring circuitry is configured to make accessible to software an indication of an identifier stored in an entry of the identifier storage structure that corresponds to one of the monitored set of addresses for which the monitoring circuitry has detected that any of the one or more events has occurred.

11. The apparatus according to claim 1, in which in response to the instruction decoder decoding a monitor polling instruction, at least one of the processing circuitry and the monitoring circuitry is configured to make accessible to software monitor polling information indicative of which of the monitored set of addresses has encountered the one or more events.

12. The apparatus according to claim 11, in which in response to the instruction decoder decoding a monitor exclusive instruction, when the exclusive status is determined to be associated with the target address, the processing circuitry is configured to allocate, to an entry of an identifier storage structure corresponding to the target address, an identifier value specified as an operand of the monitor exclusive instruction; and
the monitor polling information comprises the identifier value associated with at least one of the monitored set of addresses for which the one or more events occurred.

13. The apparatus according to claim 12, in which the identifier storage structure comprises a data structure stored in memory and the monitor polling instruction specifies a base address of the identifier storage structure.

14. The apparatus according to claim 11, in which the monitor polling information comprises a count value indicative of a number of addresses in the monitored set of addresses for which the one or more events occurred.

15. The apparatus according to claim 11, in which the processing circuitry is configured to make the monitor polling information accessible to software by writing the monitor polling information to a destination register identified by the monitor polling instruction.

16. The apparatus according to claim 1, in which the exclusive status setting instruction comprises a load exclusive instruction, and in response to the instruction decoder decoding the load exclusive instruction, the processing circuitry is configured to load data associated with the given address to at least one destination register specified by the load exclusive instruction, and set the exclusive status associated with the given address.

17. The apparatus according to claim 1, in which in response to the instruction decoder decoding a store exclusive instruction specifying a store target address and at least one source register, the processing circuitry is configured to:
determine whether the exclusive status is associated with the store target address; and
when the exclusive status is determined to be associated with the store target address, store data from the at least one source register to a memory location associated with the store target address.

18. A method comprising:
in response to decoding of an exclusive status setting instruction specifying a given address, setting an exclusive status associated with the given address;
in response to detecting an event indicative of a conflicting memory access to the given address, clearing the exclusive status associated with the given address;
in response to decoding of a monitor exclusive instruction:
determining whether the exclusive status is associated with a target address; and
when the exclusive status is determined to be associated with the target address, allocate the target address to be one of a monitored set of addresses; and
returning a monitoring allocation status indication accessible to software, the monitoring allocation status indication indicative of whether the target address was successfully allocated to be one of said monitored set of addresses in response to the monitor exclusive instruction;
monitoring one or more events indicative of a potential update to data associated with any of the monitored set of addresses; and
making accessible to software a monitoring reporting indication indicative of whether any of the one or more events has occurred for at least one of the monitored set of addresses.

19. A computer program which, when executed on a host data processing apparatus, controls the host data processing apparatus to provide an instruction execution environment for execution of instructions of target code, the computer program comprising:
instruction decoding program logic to decode instructions of the target code to control the host data processing apparatus to perform data processing corresponding to the instructions of the target code; and
monitoring program logic to monitor one or more events indicative of a potential update to data associated with any of a monitored set of addresses in a simulated address space, and to make accessible to the target code a monitoring reporting indication indicative of whether any of the one or more events has occurred for at least one of the monitored set of addresses; in which:
in response to an exclusive status setting instruction of the target code specifying a given address in the simulated address space, the instruction decoding program logic is configured to control the host data processing apparatus to set an exclusive status associated with the given address, the computer program comprising exclusive status clearing program logic to clear the exclusive status associated with the given address in response to detecting an event indicative of a conflicting memory access to the given address in the simulated address space; and in response to a monitor exclusive instruction of the target code, the instruction decoding program logic is configured to control the host data processing apparatus to:
determine whether the exclusive status is associated with a target address in the simulated address space; and
when the exclusive status is determined to be associated with the target address, allocate the target address to be one of said monitored set of addresses for which the one or more events are to be monitored by the monitoring program logic; and
return a monitoring allocation status indication accessible to software, the monitoring allocation status indication indicative of whether the target address was successfully allocated to be one of said monitored set of addresses in response to the monitor exclusive instruction.

* * * * *